United States Patent
Yamamoto et al.

(10) Patent No.: US 8,318,333 B2
(45) Date of Patent: Nov. 27, 2012

(54) BATTERY PACK AND METHOD FOR PRODUCING THE SAME

(75) Inventors: Takeru Yamamoto, Fukushima (JP); Ken Segawa, Fukushima (JP); Hiroyuki Akashi, Kanagawa (JP); Takayuki Aita, Fukushima (JP); Shunsuke Saito, Fukushima (JP)

(73) Assignee: Sony Corporation, Tokyo (JP)

( * ) Notice: Subject to any disclaimer, the term of this patent is extended or adjusted under 35 U.S.C. 154(b) by 1081 days.

(21) Appl. No.: 12/249,575

(22) Filed: Oct. 10, 2008

(65) Prior Publication Data

US 2009/0098443 A1    Apr. 16, 2009

(30) Foreign Application Priority Data

Oct. 15, 2007    (JP) ................................. 2007-267694
Feb. 8, 2008    (JP) ................................. 2008-028993

(51) Int. Cl.
*H01M 2/02* (2006.01)
(52) U.S. Cl. ............................ 429/82; 429/175; 429/163
(58) Field of Classification Search .................. 429/82, 429/163, 175
See application file for complete search history.

(56) References Cited

U.S. PATENT DOCUMENTS

2004/0170887 A1 * 9/2004 Masumoto et al. ............. 429/61

FOREIGN PATENT DOCUMENTS

| JP | 3556875 | 5/2001 |
|---|---|---|
| JP | 2004-152655 | 5/2004 |
| JP | 2004-303625 | 10/2004 |
| JP | 3614767 | 11/2004 |
| JP | 2004-358735 | 12/2004 |
| JP | 3643792 | 2/2005 |
| JP | 2005-129487 | 5/2005 |
| JP | 2005-158452 | 6/2005 |
| JP | 3691268 | 6/2005 |
| JP | 3783082 | 3/2006 |
| JP | 2006-236735 | 9/2006 |
| JP | 2007-323907 | 12/2007 |
| JP | 2002-245998 | 8/2008 |

OTHER PUBLICATIONS

Japanese Office Action (JP2007-267694) issued on Dec. 22, 2009.
Japanese Office Action issued Mar. 9, 2010, for corresponding JP2008-028993.

* cited by examiner

*Primary Examiner* — Jane Rhee
(74) *Attorney, Agent, or Firm* — K&L Gates LLP

(57) ABSTRACT

A battery pack includes a battery including a battery element covered with a packaging member, a battery protection circuit board, a covering material, and a rippable portion formed in a part of the covering material. The battery element includes a positive electrode and a negative electrode which are spirally wound or stacked through a separator. The covering material collectively covers the battery and the battery protection circuit board. The rippable portion rips open due to a gas generated from the battery in the event of an abnormal condition to form a gas release hole for releasing the gas outside the battery pack.

13 Claims, 14 Drawing Sheets

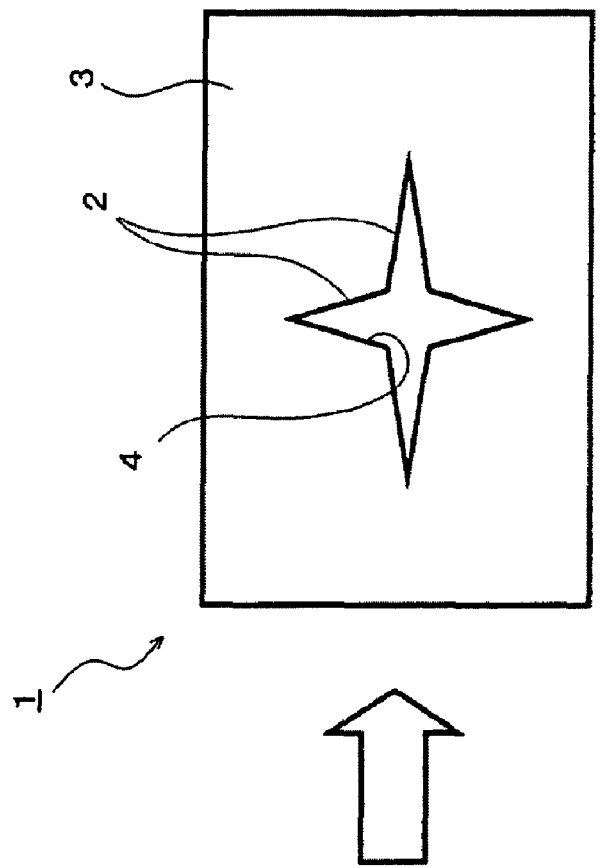
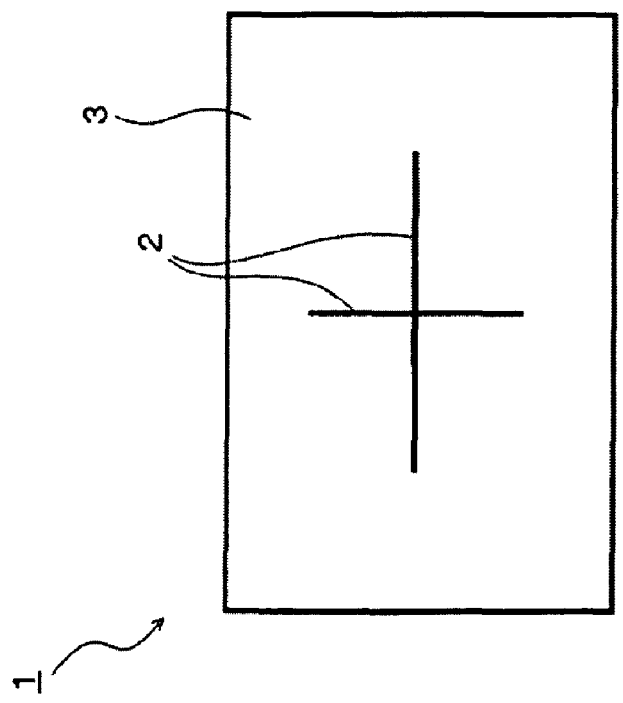

BATTERY PACK AND METHOD FOR PRODUCING THE SAME

CROSS-REFERENCE TO RELATED APPLICATIONS

The present application claims priority to Japanese patent Applications No. 2007-267694 filed in the Japanese Patent Office on Oct. 15, 2007, and No. 2008-28993 filed in the Japanese Patent Office on Feb. 8, 2008, the entire disclosures of which are incorporated herein by reference.

BACKGROUND

In recent years, various types of portable electronic devices, such as a camera-integrated videotape recorder, a cellular phone, and a laptop computer, are widely used, and those having smaller size and weight are being developed. As the portable electronic devices are reduced in size and weight, a battery pack used as a portable power source for the electronic devices is required to have increased energy and reduced size and weight. As an example of the battery used in such a battery pack, there is a lithium-ion secondary battery having a high capacity.

The lithium-ion secondary battery includes a battery element having a positive electrode and a negative electrode capable of being doped with a lithium ion and dedoped. The battery element is sealed in a metallic can or a metal laminate film and is controlled by a circuit board electrically connected to the battery element.

Known lithium-ion secondary batteries have a battery pack including a battery element sealed in a metallic can or a metal laminate film and a circuit board, which are contained in a storage casing having upper and lower spaces divided (see, for example, Japanese Patent No. 3556875, Japanese Patent No. 3614767 and Japanese Patent No. 3643792).

With respect to the battery pack for lithium-ion secondary battery, a battery pack including a battery element sealed in a metallic can and a circuit board which are molded in one piece by using a melted resin has been proposed (see, for example, Japanese Unexamined Patent Application Publication No, 2004-303625 and Japanese Unexamined Patent Application Publication No. 2004-358735).

Further, there has been proposed a battery pack including a battery element sealed in a metal laminate film, a circuit board, and a frame disposed so as to surround the battery element and circuit board, wherein the battery element, circuit board, and frame are covered with a packaging member in the form of a thin plate (see, for example, Japanese Unexamined Patent Application Publication No. 2005-158452).

In addition, there has been proposed a lithium-ion secondary battery having a construction in which a battery element and a circuit board are sealed in a rectangular casing can wherein a cap portion made of an aluminum alloy of the casing can or the casing can body made of aluminum has formed therein a burst-proof ripping open vent or thin-wall portion for releasing gas outside the casing can when the internal pressure rises due to gas generated in the event of an abnormal condition (see, for example, Japanese Patent No. 3691268 and Japanese Patent No. 3783082).

In the known lithium-ion secondary battery described above, the metallic can used for sealing a battery element is formed by deep drawing, which leads a limited elongation in the machine direction for deep drawing, so that only a metallic can having a predetermined thickness (about 200 μm) is formed, disadvantageously lowering the degree of freedom for design. In addition, a metal suitable for deep drawing is required to use, and a metallic can having a strength higher than the strength inherent in the metal constituting the can is difficult to obtain. Further, when the battery element is sealed in a metallic can, it is difficult to perform a heat-pressing step for heat-sealing a gel polymer thereafter, and therefore, only a liquid electrolyte can be used when using a metallic can.

On the other hand, when a battery element is sealed by a metal laminate film, it becomes possible to perform heat-pressing, and there are advantages in that the degree of freedom for size or shape is high. However, the battery element sealed by a metal laminate film has a drawback in that the strength is lower than that of a battery element sealed in a metallic can.

In the battery pack having a lithium-ion secondary battery and a circuit board contained in a storage casing described in Japanese Patent No. 556875, Japanese Patent No. 3614767 and Japanese Patent No. 3643792, for protecting the lithium-ion secondary battery and circuit board from an external impact and the like, a satisfactory thickness is required to the storage casing. Further, in bonding together the upper and lower divided storage casing using an adhesive double-coated tape or by ultrasonic welding, the storage casing requires a satisfactory thickness for facilitating the bonding, and the whole of the battery pack is inevitably increased in thickness or weight. Thus, such a technique is unsuitable for portable power source.

In the battery pack described in Japanese Unexamined Patent Application Publication No. 2004-303625 and Japanese Unexamined Patent Application Publication No. 2004-358735, since a battery element sealed in a metallic can having a large mechanical strength and a circuit board are combined in one unit by using a melted resin, a flexible rubber resin, as the resin, having excellent elastic properties is used for improving the resistance to drop impact. This battery element is totally different from a battery element sealed in a metal laminate film having a small mechanical strength, with respect of dimensional accuracy, production conditions, and the like. Accordingly, such a technique is not suitable to apply to the battery pack using a battery element sealed in a metal laminate film.

Further, in the battery pack using a battery element sealed in a metallic can, an electrolytic solution which is in a liquid state is used as an electrolyte. Therefore, it is necessary to provide a burst-proof structure which does not easily rip open in a usual operation, in the battery pack.

On the other hand, in the battery pack described in Japanese Unexamined Patent Application Publication No. 2005-158452, with respect to the packaging member for covering a battery element sealed in a metal laminate film, a circuit board, and a frame, a packaging member having a two-layer structure which includes a surface protecting layer composed of nylon or the like and a metal layer composed of stainless steel or the like is used. Accordingly, it becomes necessary to have a certain thickness for obtaining the hardness and moldability required. Further, an adhesive or an adhesive tape is used and therefore this battery pack is inevitably increased in thickness, and further improvement for reducing the size and weight is desired.

The use of a metal oxide ceramic in the covering material for battery pack is considered. Since the metal oxide ceramic has more excellent hardness than that of a metal, but it has brittleness and it is necessary to process into a thin covering material closely in contact with the battery pack.

The lithium-ion secondary battery having a burst-proof ripping open vent formed in the rectangular casing can described in Japanese Patent No. 3691268 and Japanese Patent No. 3783082 has not yet been put into practical use.

The reason for this resides in, for example, that a large vent valve structure is formed in the direction of the longest side of the rectangle and hence a required capacity is difficult to secure, and, as compared to a battery of a cylindrical shape, a battery of a rectangular structure requires higher cost for the parts and positioning of the individual parts with high accuracy, thus making the battery production difficult.

Accordingly, it is desirable to provide a battery pack which is advantageous not only in that the battery pack has both high dimensional accuracy and high mechanical strength and can be reduced in size and weight, but also in that it provides a high degree of safety even in an abnormal condition, and a method for producing the same.

SUMMARY

The present disclosure relates to a battery pack comprising, for example, a non-aqueous electrolyte secondary battery and a method for producing the same. More particularly, the present disclosure relates to a battery pack including a battery and a protection circuit board combined in one unit, wherein the battery includes a battery element covered with a laminate film, the battery element including a positive electrode and a negative electrode which are spirally wound or stacked through a separator, and a method for producing the same.

In an embodiment, a battery pack includes: a battery including a battery element covered with a packaging member, wherein the battery element includes a positive electrode, a negative electrode and a separator which are spirally wound or stacked through a separator; a battery protection circuit board; and a covering material for collectively covering the battery and protection circuit board, wherein the covering material is formed therein a rippable portion for releasing gas generated in the event of an abnormal condition, outside the battery pack, and then the present disclosure has been completed.

The battery pack according to an embodiment includes a battery, a battery protection board, a covering material, and a rippable portion. The battery element is covered with a packaging member wherein the battery element includes a positive electrode and a negative electrode which are spirally wound or stacked through a separator. The covering material collectively covers the battery and protection circuit. The rippable portion is formed in a part of the covering material, and is capable of ripping open due to gas generated from the battery in the event of an abnormal condition to form a gas release hole for releasing the gas outside the battery pack.

The method for producing a battery pack according to an embodiment, wherein the battery pack includes a battery including a battery element, a battery protection circuit board, and a covering material, the battery element being covered with a packaging member, the battery element including a positive electrode and a negative electrode which are spirally wound or stacked through a separator, the covering material collectively covering the battery and the battery protection circuit board while extending a terminal of the battery outside, by filling a surrounding space within a molding die containing the battery and the protection circuit board and being cured, includes by using a protrusion formed on or detachably attached to the molding die, forming a rippable portion, which is composed of a thin-wall portion as a filling mark, and which is capable of ripping open due to gas generated from the battery in the event of an abnormal condition, in the covering material filling the space around the battery and the protection circuit board within the molding die and being cured.

Furthermore, the method for producing a battery pack according to another embodiment wherein the battery pack includes a battery including a battery element, a battery protection circuit board, and a covering material, the battery element being covered with a packaging member, the battery element including a positive electrode and a negative electrode which are spirally wound or stacked through a separator, the covering material collectively covering the battery and the battery protection circuit board while extending a terminal of the battery outside, by filling a surrounding space within a molding die containing the battery and the protection circuit board and being cured, includes: disposing in the cavity of the molding die a brittle member capable of deforming due to gas generated from the battery in the event of an abnormal condition, together with the battery and the protection circuit board; and collectively covering the battery, the protection circuit board, and a brittle member with the covering material to form a rippable portion for ripping open the covering material due to deformation of the brittle member.

According to embodiment, by virtue of having the above-described construction, the battery pack is advantageous not only in that it has both high dimensional accuracy and high mechanical strength and can be reduced in size and weight, but also in that it provides a high degree of safety even in the event of an abnormal condition.

The above summary is not intended to describe each illustrated embodiment or every implementation. The figures and the detailed description which follow more particularly exemplify these embodiments.

Additional features and advantages are described herein, and will be apparent from the following Detailed Description and the figures.

BRIEF DESCRIPTION OF THE FIGURES

FIG. 1A is an explanatory top view showing a battery pack according to an embodiment, in which a thin-wall portion is formed, and FIG. 1B is an explanatory top view showing a state in which the thin-wall portion has ripped open to form a gas release hole.

DETAILED DESCRIPTION

Figure 2:
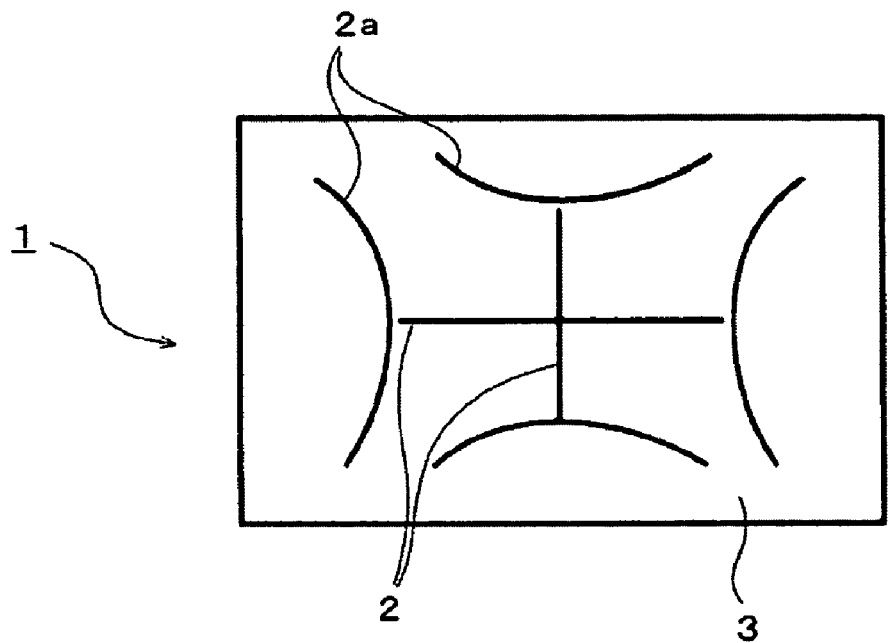
FIG. 2 is an explanatory top view showing a battery pack according to another embodiment, in which a thin-wall portion is formed.

Hereinbelow, the battery pack of an embodiment is described in detail. In the present specification, with respect to the concentration, content, amount, and others, "%" refers to a percent by mass unless otherwise specified.

As described above, the battery pack of an embodiment includes: a battery which includes a battery element covered with a packaging member, wherein the battery element includes a positive electrode and a negative electrode which are spirally wound together or stacked through a separator; a battery protection circuit board; a covering material for collectively covering the battery and the protection circuit board; and a rippable portion formed in a part of the covering material. The rippable portion is capable of ripping open due to gas generated from the battery in the event of an abnormal condition to form a gas release hole for releasing the gas outside the battery pack.

There has been a battery pack using a polymer battery by using a polymerized electrolytic solution wherein the polymer battery and a circuit board are top-sealed with a heat-sealing film, such as an aluminum laminate film, so that the heat-sealed portion rips open in the event of abnormal condition. However, in the lithium-ion secondary battery having a polymer battery and a circuit board top-sealed with a heat-sealing film, the heat-sealed portion serves as a ripping open mechanism, and therefore the battery is disadvantageous not only in that it is limited by the production process, but also in that it has a low dimensional accuracy and a low mechanical strength.

The battery pack according to an embodiment includes: a battery including a battery element covered with a packaging member, wherein the battery element includes a positive electrode and a negative electrode which are spirally wound or stacked through a separator; a battery protection circuit board; and a covering material for collectively covering the battery and the protection circuit board. As a result, the battery pack has both a high dimensional accuracy and a high mechanical strength, and can be reduced in weight and size. Further, by virtue of having a rippable portion formed in the covering material, the battery pack can release gas generated in the event of abnormal condition, outside the battery pack, thereby providing a high degree of safety.

The covering material and a rippable portion, which constitute the battery pack, are described below, and then other constituents of the battery pack are described.

Covering Material

With respect to the covering material, it is preferable to use a composite material including a shape-retaining polymer and a filler material. With respect to the shape-retaining polymer, it is preferable to be a resin having affinity, compatibility, or reactivity with the filler material and being capable of exhibiting a high dimensional accuracy and a high mechanical strength.

A general resin can exhibit fluidity when heated to a temperature higher than the melting temperature or glass transition temperature of the resin by about 50 to 150° C. Accordingly, when the covering material including a resin is filled into a molding die, the covering material is required to be heated to a temperature as high as, e.g., 180 to 450° C.

However, when the covering material heated to a high temperature is filled into a molding die, a polyethylene-based separator constituting a battery element contained in the molding die is melted to close the micropores in the separator, causing a problem in that the separator malfunctions. In addition, there is a possibility that a physical gel used as a non-aqueous electrolyte, such as polyvinylidene fluoride (PVdF), is melted so that the battery deforms. Further, there is also a possibility that a device incorporated into the protection circuit board, such as a positive temperature coefficient (PCT); the term "positive temperature coefficient" means characteristics such that, as the temperature rises, the battery resistance increases, so that the positive coefficient varies, and, in the present specification, "PCT" means a device having the above characteristics) or a temperature fuse or the like, suffers a damage, so that there exists a possibility of not acting as a protection circuit board.

Thus, with respect to the shape-retaining polymer used in the covering material, it is preferable to use a thermosetting resin curable preferably at 120° C. or lower, more preferably at 30 to 100° C., further preferably at 50 to 90° C., or an ultraviolet curing resin curable by irradiation with ultraviolet light.

Specific examples of the shape-retaining polymers include a resin selected from the group consisting of an urethane resin, an acrylic resin, and an epoxy resin, and a mixture of two or more resins selected from an urethane resin, an acrylic resin, and an epoxy resin.

The above curing resin has such excellent fluidity that a period of time from injecting the resin into a molding die to completion of curing of the resin is long, as compared to that for a thermoplastic resin, and therefore the curing resin can be filled in a narrow surrounding space within the molding die. For this reason, by using the above resin in the covering material, the covering material can be reduced in thickness, as compared to a covering material using a thermoplastic resin (for example, the covering material using a thermoplastic resin has a thickness of several hundred μm, whereas the covering material using a curing resin has a thickness of several tens to several μm), and hence can be reduced in size and weight. Further, by using the above curing resin in the covering material, the covering material can be processed into a smaller thickness with more excellent productivity than a metal plate.

Accordingly, by using the above curing resin in the covering material, the battery pack can be improved in volume energy density, and the battery pack can be easily formed, and further the dimensional accuracy is increased to improve the yield, so that the degree of freedom for design, such as size and shape, can be increased according to various applications.

Examples of curing resins used as the shape-retaining polymer include those of a one-pack type, a two-pack type, or a three-pack type, and, from the viewpoint of achieving easy storage and high productivity, it is preferable to use a curing resin of a two-pack type rather than a curing resin of a one-pack type which needs a low-temperature storage place or which requires a prolonged curing time when there is no place for storage. From the viewpoint of achieving high productivity, it is preferable to use a curing resin of a two-pack type, which is easily mixed, rather than a curing resin of a three-pack type, which needs a cumbersome mixing operation.

With respect to the covering material, in addition to the shape-retaining polymer, any one of a curing agent, an ultraviolet light absorber, and a light stabilizer is preferably used.

For improving the covering material in mechanical strength, it is preferable that the shape-retaining polymer has a good balance between an amorphous portion imparting flexibility and a crystalline portion imparting surface hardness.

When a curing agent is used together with the shape-retaining polymer, it is preferable that a curing agent having two or more crosslinking sites for reducing the crosslinking sites in a long polymer chain to form an amorphous portion imparting flexibility and a curing agent having three or more crosslinking sites for increasing the crosslinking sites in a polymer chain to form a crystalline portion imparting hardness are used in combination.

It is preferable that the covering material has excellent impact resistance and excellent mechanical strength under a usual condition and, conversely, in the event of an abnormal condition, the covering material easily breaks open to easily release gas generated from the battery outside the battery pack.

For meeting the above requirement, it is preferable that the shape-retaining polymer used in the covering material has a glass transition temperature which is equal to or higher than the temperature under a usual condition of the battery pack, and which is equal to or lower than the temperature under abnormal condition.

When the glass transition temperature of the shape-retaining polymer is equal to or higher than the temperature in a usual operation of the battery pack, thermal motion of the polymer constituting the shape-retaining polymer is suppressed, so that the shape-retaining polymer remains hard under usual condition, thereby exhibiting excellent mechanical strength.

On the other hand, when the glass transition temperature of the shape-retaining polymer is equal to or lower than the temperature under abnormal condition, thermal motion of portion of the chain polymer constituting the shape-retaining polymer is vigorous to exhibit flexibility, so that the covering material easily breaks open.

A glass transition temperature (Tg) of the shape-retaining polymer can be measured by differential scanning calorimetry (DSC).

The glass transition temperature (Tg) of the shape-retaining polymer is preferably in the range of from 45 to 130° C., more preferably 60 to 120° C., further preferably 80 to 110° C.

It is preferable that the covering material is a composite material including a shape-retaining polymer and a filler material. With respect to the filler material, ceramic filler, metal oxide filler, or metal nitride filler can be used.

Examples of metal oxide filler or metal nitride filler include oxides or nitrides of silicon (Si), aluminum (Al), titanium (Ti), zirconium (Zr), zinc (Zn), or magnesium (Mg), and arbitrary mixtures of the above oxides or nitrides. The metal oxide or metal nitride filler improves the covering material in hardness and thermal conductivity, and a layer including the metal oxide filler or metal nitride filler may be disposed in contact with a layer including the shape-retaining polymer, or the metal oxide filler or metal nitride filler may be mixed into a layer including the shape-retaining polymer. In this case, it is preferable that the metal oxide filler or metal nitride filler is uniformly dispersed in the whole of the layer of shape-retaining polymer.

The amount of the filler material mixed may be appropriately changed depending on the type of the shape-retaining polymer, but the amount is preferably 3 to 60%, based on the total mass of the shape-retaining polymer. When the amount of the filler material mixed is less than 3%, there is a possibility that a covering material having satisfactory hardness is not obtained. On the other hand, when the amount of the filler material mixed is more than 60%, a problem of the moldability in the production or the brittleness of ceramic may occur.

When the filler material has too small an average particle size, the hardness of the covering material is increased, but filling of a die with the material during the molding is adversely affected, which leads to a problem of the productivity. On the other hand, when the filler material has too large an average particle size, a desired strength is difficult to obtain, so that there is a possibility that satisfactory dimensional accuracy for the battery pack cannot be achieved. Thus, the filler material preferably has an average particle size of 0.5 to 40 μm, more preferably 2 to 20 μm.

With respect to the shape of the filler material, various shapes, such as a spherical shape, a flake shape, a plate shape, and a needle-like shape, can be employed. There is no particular limitation, but a filler material in a spherical shape is preferred since it is easy to prepare and the filler material having a uniform average particle size can be obtained at low cost, and a filler material in a needle-like shape having a high aspect ratio is preferred since the filler material easily improves the strength. A filler material in a flake shape is preferred since the filling properties can be improved when the amount of the filler material mixed is increased. According to the use or material, filler materials having different average particle sizes or shapes can be used in combination.

By virtue of using the above-mentioned specific shape-retaining polymer and filler material in the covering material for collectively covering the battery and the protection circuit board, the battery pack of an embodiment is advantageous not only in that the battery pack has a high dimensional accuracy and a high impact resistance as well as a high mechanical strength, but also in that it can be reduced in size (reduced in thickness) and weight.

The covering material preferably has the following physical properties.

The covering material preferably has a flexural strength of 10 to 120 MPa, more preferably 20 to 110 MPa, further preferably 70 to 100 MPa, measured in accordance with JIS (Japanese Industrial Standards) K7171.

The covering material preferably has a flexural modulus of 30 to 3,000 MPa, more preferably 250 to 2,500 MPa, further preferably 1,000 to 2,500 MPa, measured in accordance with JIS K7171.

The covering material preferably has a durometer D hardness of D30 to D99, more preferably D60 to D99, measured in accordance with JIS K7215.

With respect to the covering material, it is preferable that the durometer D hardness measured at a temperature under abnormal condition, for example, a temperature of 60° C. or higher is smaller than the durometer D hardness measured at a standard temperature (23±2° C.) described in JIS K7215. When the hardness of the covering material at a temperature under abnormal condition is smaller than the hardness at a standard temperature, the covering material easily rips open due to gas generated in the abnormal condition. When there is no difference in hardness of the casing between the usual operating temperature and the temperature in an unusual environment, it may difficult to secure the strength in a normal operation when the covering material is set to easily rip open at the temperature under abnormal condition. When there is no difference in hardness of the casing between the usual operating temperature and the temperature in an unusual environment, there is a possibility to quickly rip open at a temperature in an abnormal environment when the covering material secures a satisfactory strength at a time of usual operation, which is the feature of a polymer battery, thus making it difficult to achieve safety.

The covering material preferably has a durometer D hardness of D3 to D60, more preferably D5 to D30, measured at a temperature under abnormal condition, for example., a temperature of 60° C. or higher. When the covering material has a durometer D hardness of D5 to D30, measured at a temperature of 60° C. or higher, the covering material easily rips open due to gas generated in the event of an abnormal condition, and the gas is released outside the battery pack to prevent the battery pack from bursting, thus providing a safety.

Rippable Portion: Thin-Wall Portion

A rippable portion formed in the covering material is described below.

With respect to an example of a preferred embodiment of the rippable portion formed in the covering material, it is preferable that the rippable portion is a thin-wall portion composed of a filling mark formed in the covering material which is filling a molding die and which is being cured.

In the battery pack according to an embodiment, as described above, the covering material is composed of a specific shape-retaining polymer having a specific glass transition temperature, and further a rippable portion composed of a thin-wall portion is formed in the covering material. Therefore, even in a battery pack having a shape such that a polymer battery is covered with the covering material, the thin-wall portion easily rips open due to gas generated from the battery in the event of an abnormal condition to release the gas outside the battery pack through a gas release hole formed from the ripping open thin-wall portion, so that the battery pack is prevented from bursting, thus providing a safety.

When a thin-wall portion is formed in the covering material, the thin-wall portion serves as a ripping portion in an abnormal condition. Therefore, with respect to the battery pack having the battery and the protection circuit board which are combined into one-unit by using the covering material, it is expected that the battery pack having a thin-wall portion formed in the covering material has a small impact resistance, as compared to a battery pack having no thin-wall portion formed.

It has been determined that the battery pack having a thin-wall portion formed has an impact resistance higher than that of a battery pack having no thin-wall portion formed.

The reason for this is presumed that the thin-wall portion formed in the covering material absorbs an impact upon dropping or the like to increase the resistance to deformation.

By forming a thin-wall portion constituting the rippable portion in the covering material, the battery pack of an embodiment not only can achieve the safety but also can improve the mechanical strength.

Next, a preferred embodiment of the thin-wall portion constituting the rippable portion is described. The shape of the thin-wall portion constituting the rippable portion is not limited to examples shown below, and a place in which the thin-wall portion is formed may be any of the side portion, top portion, and bottom portion of the battery pack. The side portion of the battery pack indicates a portion near either side, the top portion indicates a portion near the side on which the positive electrode terminal and negative electrode terminal of the battery are disposed, and the bottom portion indicates a portion near the side opposite to the top portion.

FIGS. 1 to 5 are top views showing examples of the preferred embodiment of a thin-wall portion 2 formed in a covering material 1.

As shown in FIG. 1A, the thin-wall portion (groove portion or recess portion formed in part of the largest surface of the covering material 1) 2 constituting the rippable portion formed in the covering material 1 in a substantially rectangular plate shape is preferably formed in at least one surface in the largest surfaces (specifically, the top and back surfaces) 3 of the covering material 1, and may be formed in the both surfaces.

When the thin-wall portion 2 is formed in the largest surface 3 of the covering material 1, the rippable portion composed of the thin-wall portion 2 is formed near the sealed portion of the packaging member covering the battery element, so that the thin-wall portion 2 easily rips open due to gas generated in the event of an abnormal condition to release the gas outside the battery pack.

Further, as shown in FIG. 1A, it is preferable that the thin-wall portion 2 forms a rotational symmetrical body from two segment recess portions which cross each other.

When the thin-wall portion 2 forms the above rotational symmetrical body, gas generated from the battery applies a uniform pressure to the whole of the largest surface 3 of the covering material 1, so that the thin-wall portion smoothly rips open to form a gas release hole 4, thus improving the safety (see FIG. 1B).

The rotational symmetry means that, when a certain shape is rotated with respect to a certain axis of rotation, the rotated shape goes back to the original shape.

FIG. 2 is a top view showing a battery pack having thin-wall portions 2a composed of curved segment recess portions, which are curved and rounded in the direction of the center of the largest surface 3, formed at the respective ends of the thin-wall portions 2 shown in FIG. 1 forming a rotational symmetrical body from two segment recess portions which cross each other.

Figure 3:
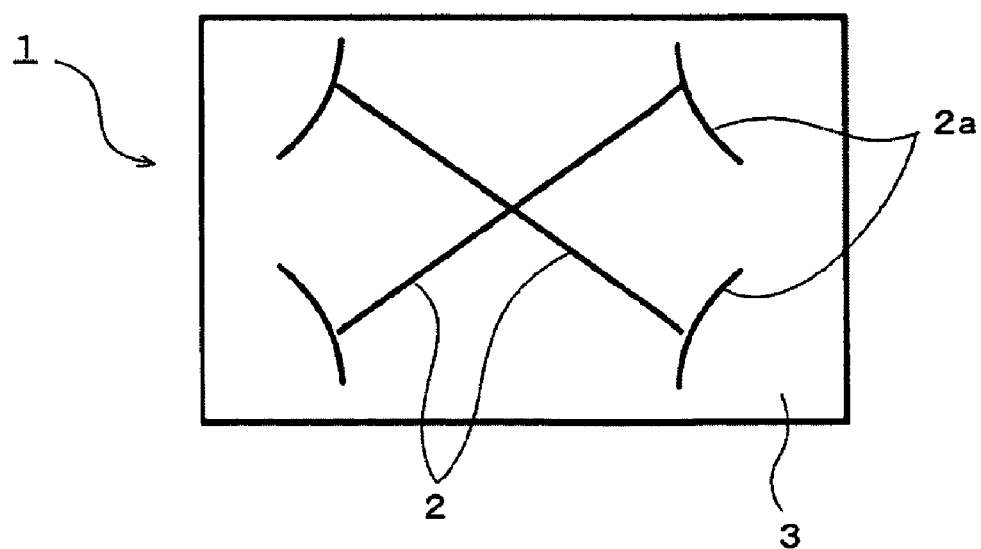
FIG. 3 is an explanatory top view showing a battery pack according to another embodiment, in which a thin-wall portion is formed.

FIG. 3 is a top view showing a battery pack having thin-wall portions 2 forming a rotational symmetrical body from two segment recess portions, which cross each other, formed on the diagonal lines of the largest surface 3 of the covering material 1, and having thin-wall portions 2a composed of curved segment recess portions, which are curved and rounded in the direction of the center of the largest surface 3, formed at the respective ends of the thin-wall portions 2.

The thin-wall portions 2, 2a both advantageously ripped open to enlarge the gas release hole. With respect to the thin-wall portion constituting the rippable portion, which has a shape such that the thin-wall portion is in the same plane of the covering material as shown in FIGS. 1 to 3, even when the thin-wall portion breaks to form a gas release hole in the covering material, it is possible to prevent pieces of the split covering material from scattering, thus improving the safety.

Figure 4B:
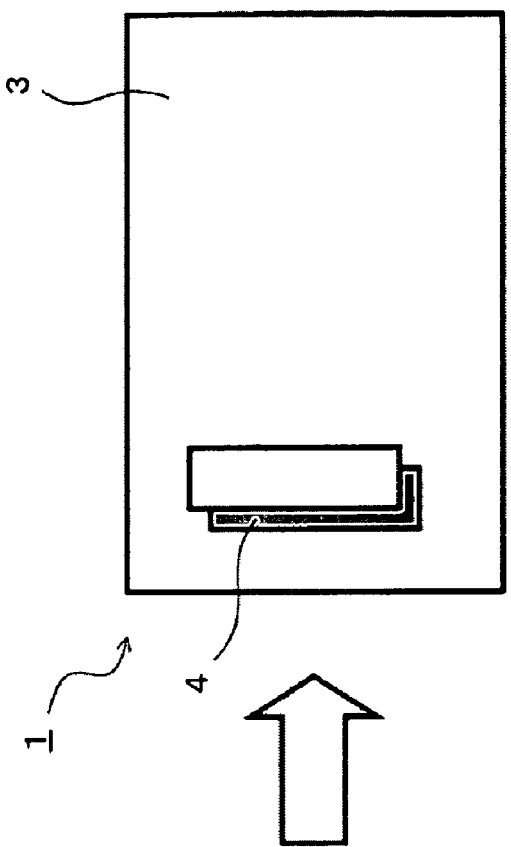
FIG. 4B is an explanatory top view showing a state in which the thin-wall portion has ripped open to form a gas release hole.
Figure 4A:
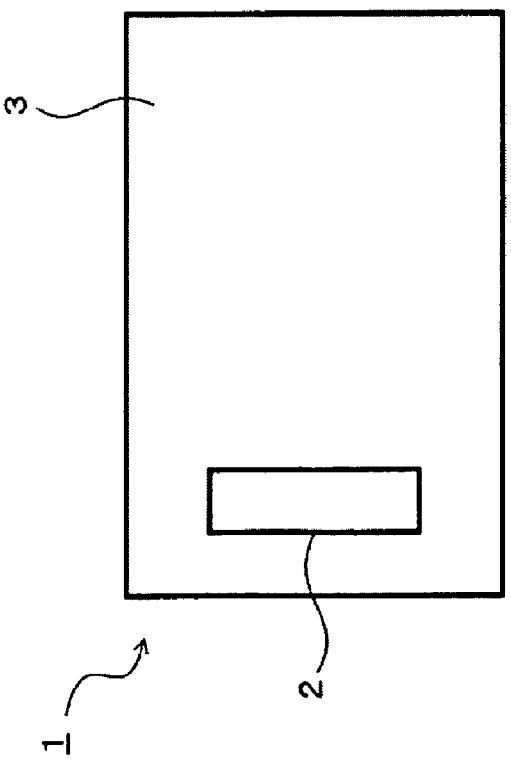
FIG. 4A is an explanatory top view showing a battery pack according to another embodiment, in which a thin-wall portion is formed.
Figure 5:
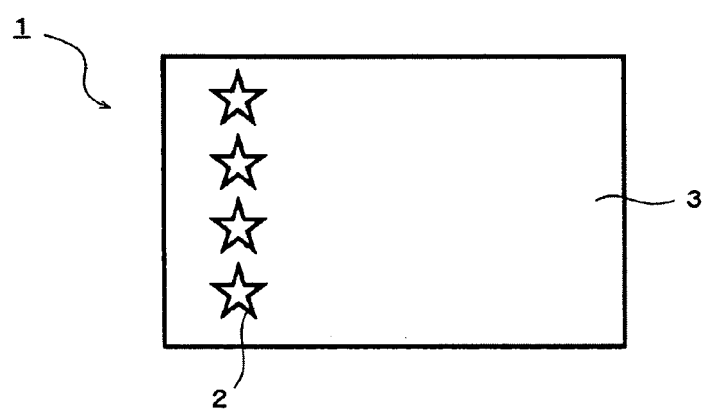
FIG. 5 is an explanatory top view showing a battery pack according to another embodiment, in which a thin-wall portion is formed.

FIGS. 4 and 5 are top views showing other examples of the preferred embodiment of the thin-wall portion 2 formed in the covering material 1.

FIG. 4A shows an example in which a thin-wall portion 2 composed of one rectangular, blocked linear recess portion is formed in a portion of the largest surface 3 of the covering material 1 facing the terminal of the battery contained in the covering material 1, and FIG. 5 shows an example in which thin-wall portions 2 composed of four polygonal (decagonal or star-like shape) blocked linear recess portions are formed near the top portion of the largest surface 3 of the covering material 1.

The gas generated in the event of an abnormal condition is likely to be generated from a terminal portion of the battery, and therefore, when the thin-wall portion 2 constituting the rippable portion is formed in a site facing the terminal of the battery, the thin-wall portion 2 advantageously easily rips out due to the gas generated from the battery to facilitate formation of the gas release hole 4 (see FIG. 4B).

Figure 6:
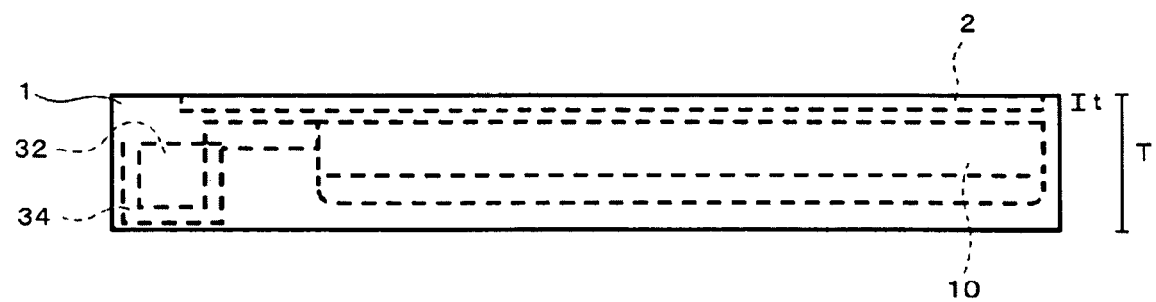
FIG. 6 is an explanatory side view showing a battery pack according to an embodiment, in which a thin-wall portion is formed.

FIG. 6 is a side view of a battery pack having formed a thin-wall portion 2 constituting the rippable portion. As shown in FIG. 6, the thin-wall portion 2 constituting the rippable portion preferably has a thickness (depth of the recess portion) t with respect to the thickness T of the covering material 1 of 20 to 85%, more preferably 40 to 80%.

When the thickness t of the thin-wall portion is more than 85% of the thickness T and 100 μm or more, the thin-wall portion 2 does not easily rip open, so that the gas cannot not released outside the battery pack. On the other hand, when the thickness t of the thin-wall portion is less than 20% of the thickness T, the mechanical strength of the battery pack is lowered. In FIG. 6, reference numeral 10 denotes battery, reference numeral 32 denotes protection circuit board, and reference numeral 34 denotes cushioning material.

It is preferable that the thin-wall portion constituting the rippable portion is composed of a protrusion mark (filling mark) formed by a protrusion formed on or attached to the molding die in the covering material filling the molding die and being cured. By virtue of a protrusion formed on the molding die or, e.g., a protrusion detachably attached to the molding die, the thin-wall portion constituting the rippable portion can be easily formed in the covering material together with collectively covering together the battery and the circuit board with the covering material. The thin-wall portion thus formed can be used as a notch in packing the battery pack.

The method for forming the thin-wall portion constituting the rippable portion is not limited to the above example, and, for example, a method may be used in which the covering material is molded and then a groove portion is mechanically formed in the surface of the covering material, and the resultant groove portion is used as a thin-wall portion.

Rippable Portion: Brittle Member

Another example of preferred embodiment of the rippable portion formed in the covering material is described.

It is preferable that the rippable portion is composed of a brittle member embedded in the covering material, together with the battery and the protection circuit board, wherein the brittle member has a mechanical strength smaller than that of the covering material. It is preferable that the brittle member has a space portion therein.

Gas generated in the event of an abnormal condition presses the brittle member or flows into the space portion in the brittle member, and then the brittle member deforms, e.g., rips inside the covering material, and energy caused upon deforming of the brittle member allows the covering material to rip open to form a gas release hole, so that the gas is released outside the battery pack to prevent the battery pack from bursting, thus making it possible to achieve the safety of the battery pack.

With respect to the shape of the brittle member constituting the rippable portion, there is no particular limitation, and a brittle member having a general shape of cuboid, cube, cylinder, cone, prism, or pyramid may be used.

It is preferable that the brittle member has a length of one side of one surface of the brittle member, which length corresponds to 3% or more of the length of the longest side of the largest area of the covering material, or which length is 1 mm or longer, and that the brittle member has a thickness of 20% or more or a thickness of 100 μm or less, of the total thickness of the covering material.

When the brittle member has a size in the above range, the brittle member deforms, e.g., rips due to gas generated in the event of the abnormal condition and energy caused upon deforming surely allows the covering material to rip open, making it possible to release the gas outside the battery pack.

The brittle member can be formed using a known resin having a mechanical strength smaller than that of the covering material at a temperature presumed that an abnormal condition occurs, for example, a temperature of 60° C. or higher. For example, the brittle member can be formed using a rubber, a plastic, or the like.

It is preferable that the brittle member has a durometer D hardness at 60° C. of D3 to D60, measured in accordance with JIS K7215, and the brittle member has a durometer A hardness at 60° C. of A20 to A90, measured in accordance with JIS K6253.

When the brittle member has a hardness in the above range, the brittle member first undergoes deformation, such as burst, due to gas generated from the battery and the like in a temperature range presumed that an abnormal condition occurs, e.g., 60° C. or higher, so that energy caused upon deforming allows the covering material to rip open, making it possible to release the gas outside the battery pack.

The brittle member preferably contains at least one member selected from the group consisting of a fire-extinguishing agent and a heat-absorbing agent.

When the brittle member contains at least one member selected from the group consisting of a fire-extinguishing agent and a heat-absorbing agent, in an abnormal condition at a high temperature, for example, 200° C. or higher at which gas is inevitably generated from the battery, the fire-extinguishing agent or heat-absorbing agent can be released from the brittle member which has deformed due to the gas to suppress a temperature elevation reaction caused by the gas.

A fire-extinguishing agent and/or a heat-absorbing agent may be mixed into the brittle member and contained inside the brittle member, or may be put into the space portion in the brittle member.

With respect to the fire-extinguishing agent, a fire-extinguishing agent generally known, for example, a halogen compound, such as Halon 2402, Halon 1211, or Halon 1301, a phosphorus compound, such as ammonium phosphate, a carbonate compound, such as sodium hydrogencarbonate or potassium hydrogencarbonate, or a foaming compound comprised mainly of a surfactant can be used.

With respect to the heat-absorbing agent, for example, a ceramic, such as alumina or silica, powder comprising a metal, such as metallic nickel or a metallic ceramic, or the powder solidified with a resin having a volume heat capacity of higher than 2 J/K·cm$^3$ may be used.

Next, the position at which the brittle member constituting the rippable portion is formed is described with reference to the drawings.

Figure 7:
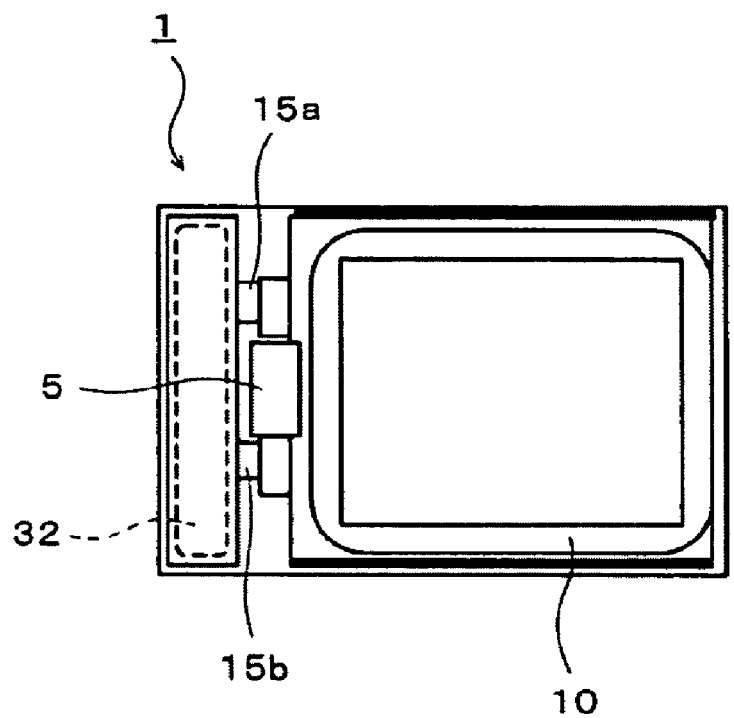
FIG. 7 is an explanatory top view showing a battery pack according to an embodiment, in which a brittle member is formed.
Figure 8:
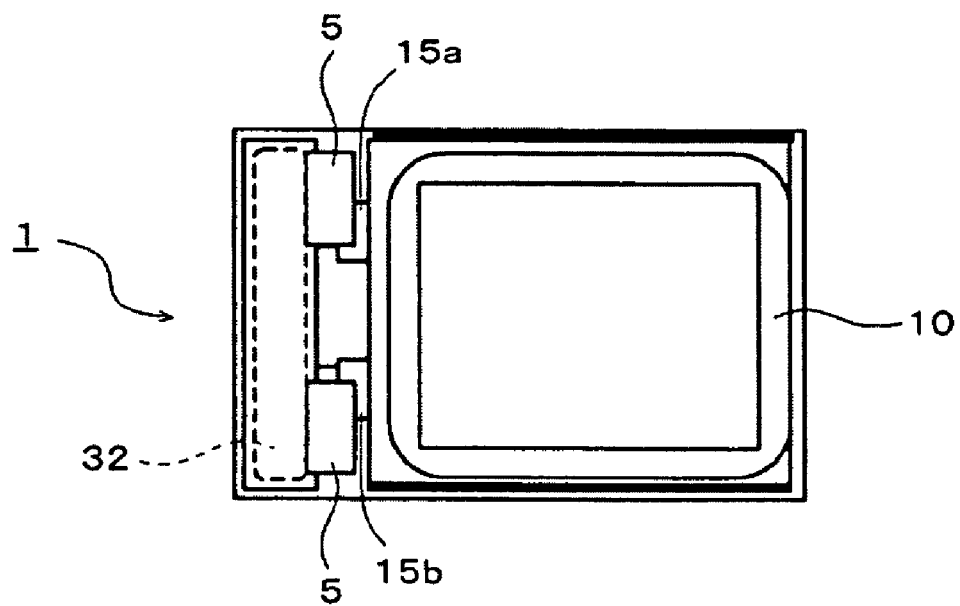
FIG. 8 is an explanatory top view showing a battery pack according to another embodiment, in which a brittle member is formed.
Figure 9:
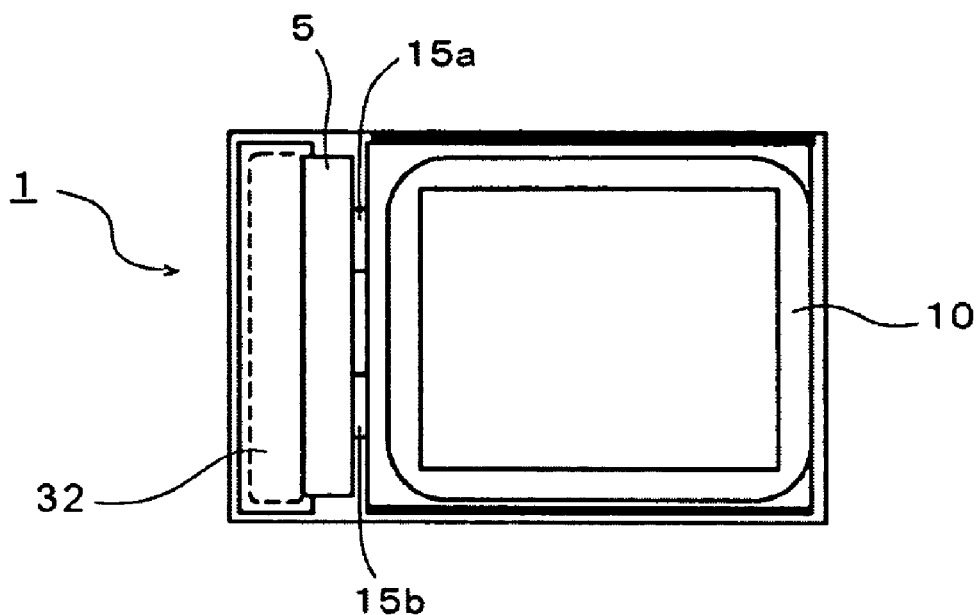
FIG. 9 is an explanatory top view showing a battery pack according to another embodiment, in which a brittle member is formed.

FIGS. 7 to 9 are top views showing examples of the preferred embodiment of a covering material 1 having a brittle member 5 formed therein.

FIG. 7 shows a state in which a brittle member 5 is formed between a positive electrode terminal 15a and a negative electrode terminal 15b of a battery 10, FIG. 8 shows a state in which brittle members 5, 5 are formed, respectively, at the upper portion of a positive electrode terminal 15a and at the upper portion of a negative electrode terminal 15b of a battery 10, and FIG. 9 shows a state in which a single brittle member 5 is formed over the upper portion of a positive electrode terminal 15a and the upper portion of a negative electrode terminal 15b of a battery 10. In FIGS. 7 to 9, reference numeral 32 denotes protection circuit board.

When the brittle member 5 is formed near the positive electrode terminal 15a and negative electrode terminal 15b of the battery 10, the brittle member 5 easily deforms due to gas generated in the event of an abnormal condition and energy caused upon deforming surely allows the covering material to rip open to form a gas release hole, so that the gas easily is released outside the battery pack, thus making it possible to avoid a danger of bursting.

Figure 10:
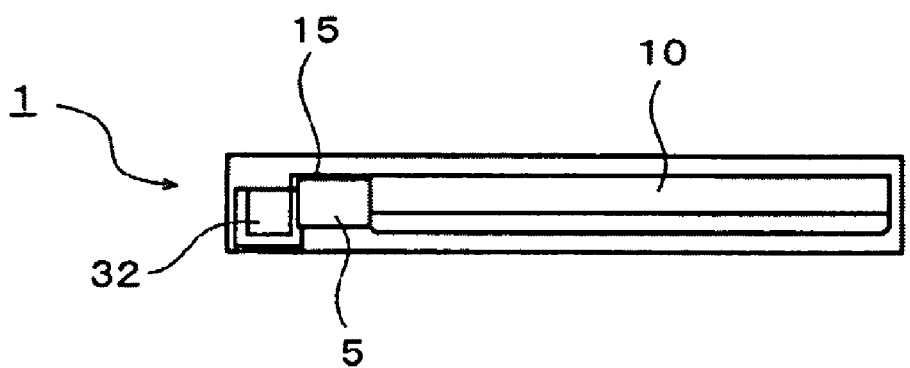
FIG. 10 is an explanatory side view showing a battery pack according to another embodiment, in which a brittle member is formed.
Figure 11:
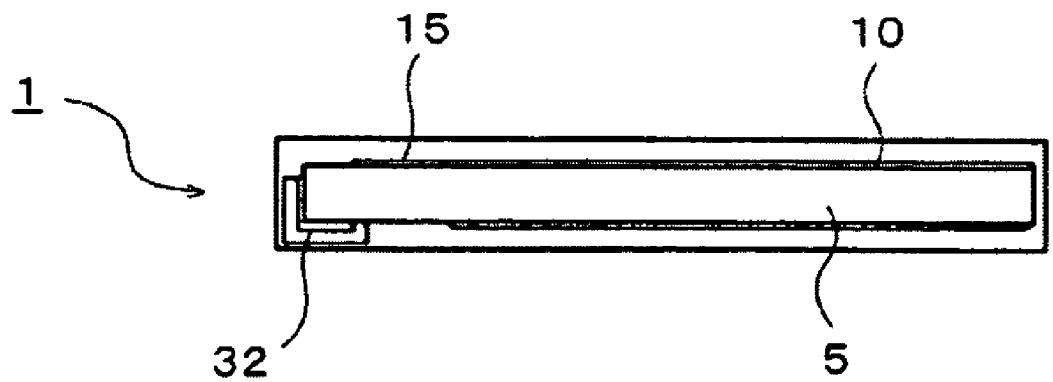
FIG. 11 is an explanatory side view showing a battery pack according to another embodiment, in which a brittle member is formed.

FIGS. 10 and 11 are side views showing other examples of the preferred embodiment of a covering material 1 having embedded therein a brittle member 5.

FIG. 10 shows a state in which a brittle member 5 is formed in the outer side of a terminal 15 of a battery 10, and FIG. 11 shows a state in which a brittle member 5 is formed in the outer side of both a protection circuit board 32 and a battery 10.

In the examples shown in FIGS. 10 and 11, the brittle member 5 is formed near the top portion of the covering material 1, but the position is not limited to the examples, and the brittle member 5 may be formed in the side portion of the covering material 1 or in the top portion or bottom portion of the covering material 1, or may be formed in any position in the space around the battery and protection circuit board within a molding die. Either a single brittle member or a plurality of brittle members may be formed.

It is preferable that the brittle member constituting the rippable portion is formed by disposing the brittle member in a surrounding space within a molding die, together with the battery and the protection circuit board, and collectively covering the battery, the protection circuit board, and brittle member with the covering material filling the cavity of the molding die.

Next, the battery pack is described in detail with reference to the drawings.

Figure 16:
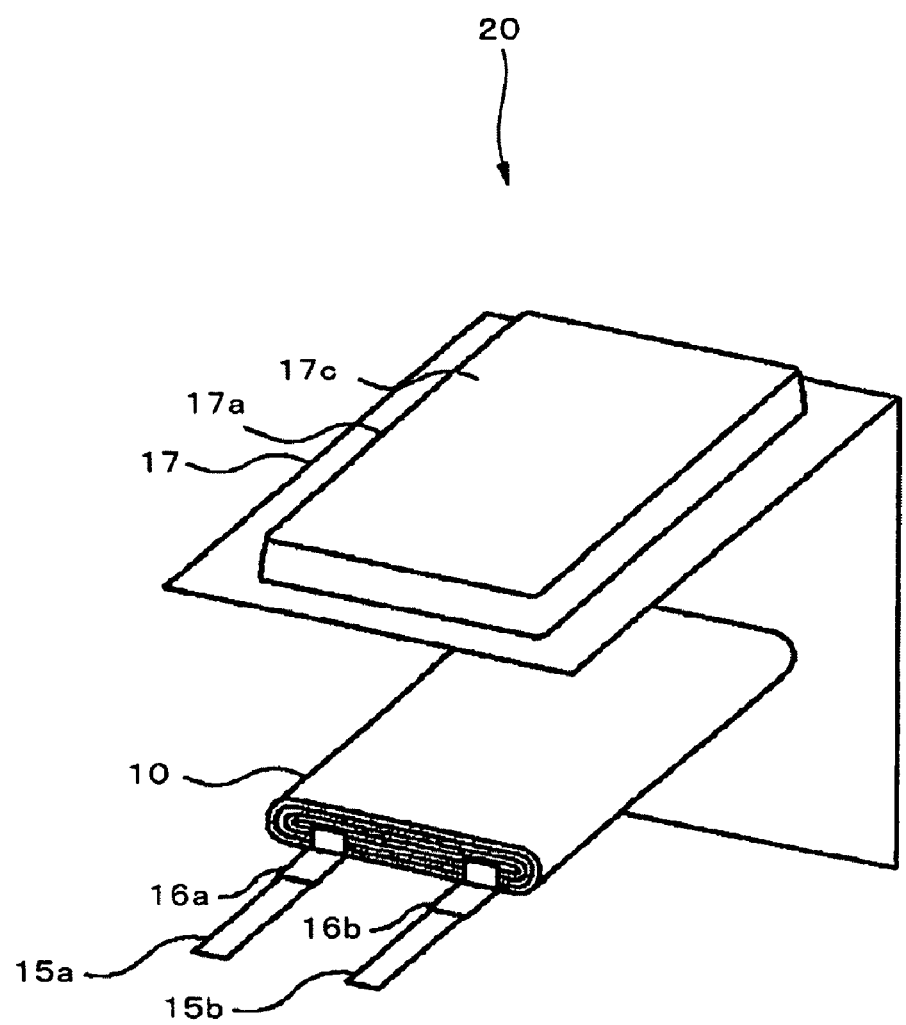
FIG. 16 is an explanatory, exploded perspective view showing the battery in the battery pack of FIG. 12 before being covered with a covering material.

FIGS. 12 to 18 show a battery pack according to an embodiment, and, as shown in FIG. 16, the battery pack includes a battery 20 having a battery element 10 covered with a metal laminate film 17. In the battery 20, the battery element 10 is contained in a container portion 17a (space portion 17a) formed in the laminate film 17, and the edge portions of the laminate film are sealed up. In this case, the space portion 17a in the laminate film 17 has a space in a rectangular plate form according to the battery element 10 in a rectangular plate shape.

Figure 17:
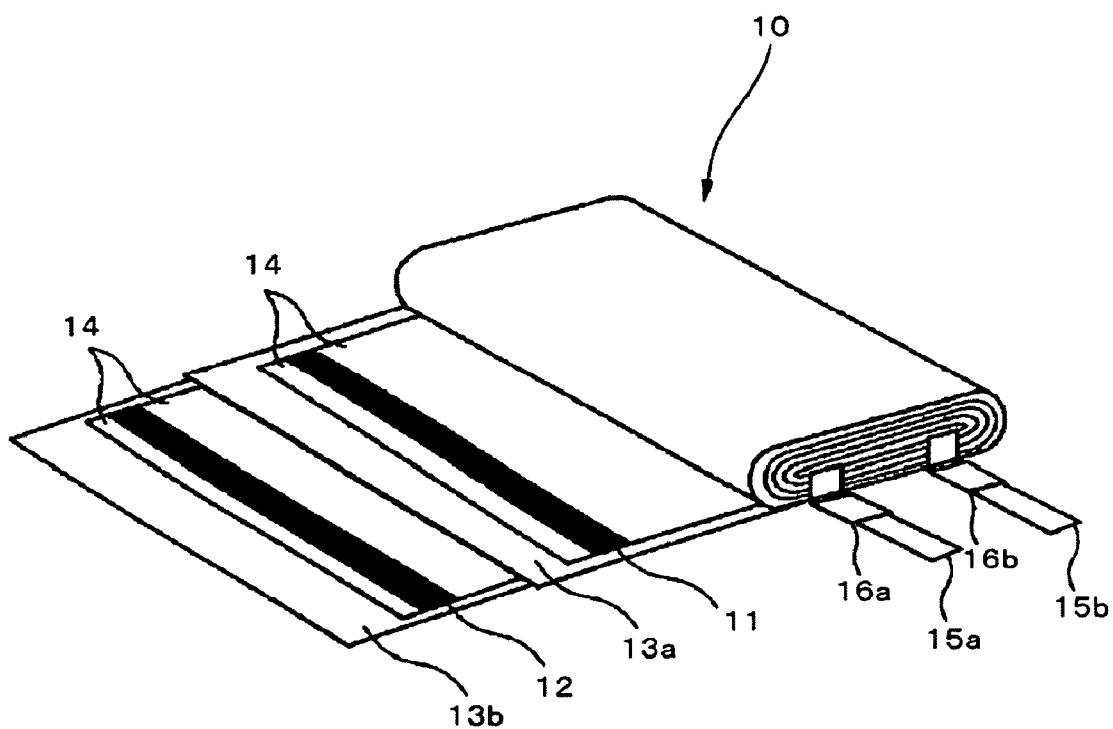
FIG. 17 is an explanatory perspective view showing a battery element to be covered with and contained in a laminate film.
Figure 18A:
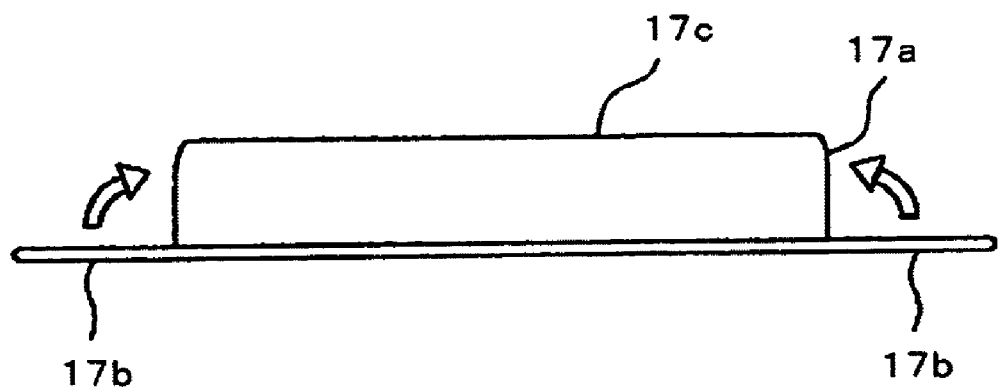
FIGS. 18A and 18B are explanatory end views showing a way of bending side sealing portions of the battery shown in FIG. 16.
Figure 18B:
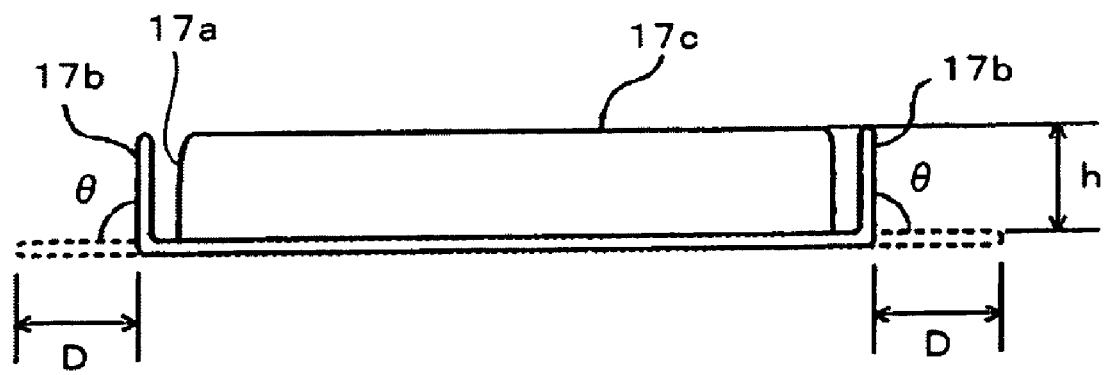

The battery element 10 includes, as shown in FIG. 17, a strip positive electrode 11, a separator 13a, a strip negative electrode 12 disposed opposite to the positive electrode 11, and a separator 13b, which are stacked on one another and spirally wound together in the longitudinal direction, and a gel electrolyte 14 is coated to both sides of each of the positive electrode 11 and the negative electrode 12.

A positive electrode terminal 15a connected to the positive electrode 11 and a negative electrode terminal 15b connected to the negative electrode 12 (hereinafter, referred to as "electrode terminal 15" unless otherwise specified) are electrically extended from the battery element 10. The positive electrode terminal 15a and negative electrode terminal 15b are, respectively, coated with sealants 16a and 16b (hereinafter, frequently referred to as "sealant 16" unless otherwise specified) as a resin piece composed of maleic anhydride-modified polypropylene (PPa) or the like for improving the adhesion with the laminate film 17 which covers the battery element later.

Hereinbelow, constituents of the above-described battery (before covered with the covering material) are described in detail.

Positive Electrode

The positive electrode includes a cathode active material layer including a cathode active material and being formed on both sides of a positive electrode current collector. The positive electrode current collector is composed of a metallic foil, such as an aluminum (Al) foil. On the other hand, the cathode active material layer includes, for example, a cathode active material, a conductor, and a binder. The cathode active material, conductor, binder, and solvent is mixed in any amounts as long as they are uniformly dispersed.

With respect to the cathode active material, a metal oxide, a metal sulfide, or a specific polymer can be used according to the type of a desired battery. For example, when a lithium-ion battery is formed, there can be mainly used a composite oxide of lithium and a transition metal, represented by the following formula (1):

$$Li_xMO_2 \qquad (1)$$

wherein M represents at least one transition metal, and X varies depending on the charged or discharged state of the battery, and is generally 0.05 to 1.10.

With respect to the transition metal (M) constituting the lithium composite oxide, cobalt (Co), nickel (Ni), manganese (Mn), or the like can be used.

Specific examples of the lithium composite oxides include $LiCoO_2$, $LiNiO_2$, $LiMn_2O_4$, and $LiNi_yCO_{1-y}O_2$ (0<y<1). A solid solution obtained by replacing part of the transition metal element in the lithium composite oxide by another element may be used, and examples of the solid solutions include $LiNi_{0.5}Co_{0.5}O_2$ and $LiNi_{0.8}Co_{0.2}O_2$. These lithium composite oxides can generate a high voltage and have an excellent energy density. Alternatively, with respect to the cathode active material, a metal sulfide or oxide containing no lithium, such as $TiS_2$, $MoS_2$, $NbSe_2$, or $V_2O_5$, may be used. These cathode active materials may be used individually or in combination.

With respect to the conductor, a carbon material, such as carbon black or graphite, may be used. With respect to the binder, for example, polyvinylidene fluoride or polytetrafluoroethylene may be used. With respect to the solvent, for example, N-methylpyrrolidone may be used.

The above-described cathode active material, binder, and conductor are intimately mixed with one another to prepare a cathode composition, and the cathode composition prepared is dispersed in a solvent to form a slurry. Then, the resultant slurry is uniformly coated to the cathode current collector by a doctor blade method or the like, and then dried at a high temperature to remove the solvent, followed by pressing, thus forming a cathode active material layer.

The positive electrode 11 has a positive electrode terminal 15a connected to one end of the positive electrode current collector by spot welding or ultrasonic welding. The positive electrode terminal 15a is desirably composed of a metallic foil or mesh, but the terminal may be composed of any material other than metals as long as the material is electrochemically and chemically stable and can achieve electrical conduction. Examples of materials for the positive electrode terminal 15a include aluminum.

Negative Electrode

The negative electrode includes an anode active material layer including an anode active material and being formed on both sides of a negative electrode current collector. The negative electrode current collector is composed of a metallic foil, such as a copper (Cu) foil, a nickel foil, or a stainless steel foil.

The anode active material layer includes, for example, an anode active material, and optionally a conductor and a binder. Like the cathode active material layer, the anode active material, conductor, binder, and solvent may be mixed in any amounts.

With respect to the anode active material, metallic lithium, a lithium alloy, a carbon material capable of being doped with lithium and dedoped, or a composite material of a metal material and a carbon material may be used. Specific examples of carbon materials capable of being doped with lithium and dedoped include graphite, hardly graphitizable carbon, and easily graphitizable carbon. More specifically, a carbon material, such as pyrolytic carbon, coke (pitch coke, needle coke, or petroleum coke), graphite, glassy carbon, a calcined product of an organic polymer compound (obtained by carbonizing a phenolic resin, a furan resin, or the like by calcination at an appropriate temperature), carbon fiber, or activated carbon, may be used. Further, with respect to the material capable of being doped with lithium and dedoped, a polymer, such as polyacetylene or polypyrrole, or an oxide, such as $SnO_2$, may be used.

With respect to the material capable of being alloyed with lithium, various types of metals may be used, but tin (Sn), cobalt (Co), indium (In), aluminum, silicon (Si), or an alloy thereof is generally used. When using metallic lithium, it is not always necessary to mix lithium powder with a binder to form a coating film, and a method may be employed in which a rolled lithium metallic foil is bonded with a current collector by pressing.

With respect to the binder, for example, polyvinylidene fluoride or a styrene-butadiene rubber may be used. With respect to the solvent, for example, N-methylpyrrolidone or methyl ethyl ketone may be used.

The above-described anode active material, binder, and conductor are intimately mixed with one another to prepare an anode composition, and the anode composition prepared is dispersed in a solvent to form a slurry. Then, the resultant slurry is uniformly coated to the negative electrode current collector by the same method as that for the positive electrode, and then dried at a high temperature to remove the solvent, followed by pressing, thus forming an anode active material layer.

Like the positive electrode 11, the negative electrode 12 has a negative electrode terminal 15b connected to one end of the current collector by spot welding or ultrasonic welding, and the negative electrode terminal 15b may be composed of any material other than metals as long as the material is electrochemically and chemically stable and can achieve electrical conduction. Examples of materials for the negative electrode terminal 15b include copper and nickel.

As described above, when the battery element 10 is in a rectangular plate shape, it is preferable that the positive electrode terminal 15a and negative electrode terminal 15b are electrically extended from the same side (generally one short side), but they may be electrically extended from any sides as long as short-circuiting or the like does not occur and there is no adverse effect on the battery performance. With respect to the connection of the positive electrode terminals 15a and 15b, the connection position and the method for the connection are not limited to the examples described above as long as electrical contact can be made.

Electrolytic Solution

In the electrolytic solution, an electrolyte salt and a non-aqueous solvent generally used in lithium-ion battery can be used.

Specific examples of non-aqueous solvents include ethylene carbonate, propylene carbonate, γ-butyrolactone, dimethyl carbonate, diethyl carbonate, ethylmethyl carbonate, dipropyl carbonate, ethylpropyl carbonate, and solvents obtained by replacing the hydrogen in the above carbonates by a halogen. These solvents may be used individually or in combination.

With respect to the lithium salt as an example of electrolyte salt, a material used in a general electrolytic solution for battery can be used. Specific examples include LiCl, LiBr, LiI, $LiClO_3$, $LiClO_4$, $LiBF_4$, $LiPF_6$, $LiNO_3$, $LiN(CF_3SO_2)_2$, $LiN(C_2F_5SO_2)_2$, $LiAsF_6$, $LiCF_3SO_3$, $LiC(SO_2CF_3)_3$, $LiAlCl_4$, and $LiSiF_6$. From the viewpoint of achieving excellent oxidative stability, $LiPF_6$ or $LiBF_4$ is desired. These lithium salts may be used individually or in combination. The concentration of the lithium salt dissolved in the non-aqueous solvent may be any concentration as long as the lithium salt can be dissolved in the above non-aqueous solvent, but the lithium ion concentration in the non-aqueous solvent is preferably in the range of from 0.4 to 2.0 mol/kg.

When using a gel electrolyte, the above electrolytic solution is gelled with a matrix polymer to obtain a gel electrolyte. With respect to the matrix polymer, there may be used any polymer which is compatible with the non-aqueous electrolytic solution including the above electrolyte salt dissolved in the non-aqueous solvent and which can be gelled. Examples of the matrix polymers include polymers comprising polyvinylidene fluoride, polyethylene oxide, polypropylene oxide, polyacrylonitrile, or polymethacrylonitrile in the repeating units. These polymers may be used individually or in combination.

Of these, an especially preferred matrix polymer is polyvinylidene fluoride or a copolymer including hexafluoropropylene in an amount of 7.5% or less incorporated into polyvinylidene fluoride. The polymer generally has a number average molecular weight in the range of from $5.0 \times 10^5$ to $7.0 \times 10^5$ (500,000 to 700,000) or a weight average molecular weight in the range of from $2.1 \times 10^5$ to $3.1 \times 10^5$ (210,000 to 310,000) and an intrinsic viscosity in the range of from 1.7 to 2.1 dl/g.

Separator

The separator is composed of, for example, a porous film made of a polyolefin material, such as polypropylene (PP) or polyethylene (PE), or a porous film made of an inorganic material, such as ceramic nonwoven fabric, and may be composed of two or more porous films stacked into a laminated structure. Of these, a porous film made of polyethylene or polypropylene may be the most effective.

Generally, the usable separator preferably has a thickness of 5 to 50 μm, more preferably 7 to 30 μm. When the separator has too large a thickness, the ratio of the active material to the separator is reduced to lower the battery capacity, and further the ion conductivity becomes poor, so that the current properties become poor. On the other hand, when the separator has too small a thickness, the film of separator is reduced in mechanical strength.

Preparation of Battery

The gel electrolyte solution thus prepared is uniformly coated to each of the positive electrode 11 and the negative electrode 12 so that the cathode active material layer and anode active material layer are individually impregnated with the gel electrolyte solution, followed by storage at room temperature or drying, to form a gel electrolyte layer 14.

Then, using the positive electrode 11 and negative electrode 12 each having the gel electrolyte layer 14 formed thereon, the positive electrode 11, separator 13a, negative electrode 12, and separator 13b are stacked on one another in this order and then spirally wound together to form a battery element 10. Subsequently, the battery element 10 is contained in a container portion (space portion) 17a of a laminate film 17 and covered with the film to obtain a gel non-aqueous electrolyte secondary battery.

With respect to the laminate film 17, a known metal laminate film, e.g., an aluminum laminate film may be used. With respect to the aluminum laminate film, a film suitable for drawing and for forming the container portion 17a for containing therein the battery element 10 is advantageously used.

Generally, the aluminum laminate film has a stacked structure including a bonding layer and a surface protecting layer disposed on both sides of an aluminum layer, and, in the order from the inner side, i.e., the side of the surface of the battery element 10, a polypropylene layer (PP layer) as a bonding layer, an aluminum layer as a metal layer, and a nylon layer or polyethylene terephthalate layer (PET layer) as a surface protecting layer are disposed.

In the present embodiment, as shown in FIGS. 16 and 17, the battery element 10 is covered with the laminate film 17 described above, and the film around the battery element 10 is heat-sealed to form a battery 20.

The battery element 10 is covered with the laminate film 17 and the film is sealed as described above and then, as shown in FIGS. 18A and 18B, portions 17b on both sides of the container portion 17a containing the battery element 10 (hereinafter, frequently referred to as "side sealing portions") are bent in the direction of the container portion 17a.

It is preferable that the bent angle θ is in the range of from 80 to 100°. When the bent angle is less than 80°, the side sealing portions 17b on both sides of the container portion 17a are opened so widely that the width of the battery 20 is increased, making it difficult to reduce the battery 20 in size and improve the battery capacity. A bent angle of 100° as the upper limit is determined depending on the form of the container portion 17a, and, when the container portion contains therein a flat-type battery element 10, the upper limit of the bent angle is about 100°. The heat-sealed width for the side sealing portion 17b is preferably 0.5 to 2.5 mm, more preferably 1.5 to 2.5 mm.

For reducing the battery 20 in size and improving the battery capacity, it is preferable that the bent width D of the side sealing portion 17b is equal to or less than the height h of the container portion 17a or the thickness of the battery element 10. Further, for reducing the non-aqueous electrolyte secondary battery 20 in size and improving the battery capacity, it is preferable that the number of bending is one.

Next, a method for producing a battery pack according to an embodiment is described.

In the method for producing a battery pack according to an embodiment, the non-aqueous electrolyte secondary battery 20 thus prepared is contained in a surrounding space within a molding die, together with a protection circuit board being capable of controlling a voltage and a current of the battery and a spacer, and the battery and protection circuit board are disposed in a predetermined position within the cavity using the spacer, and then the cavity is filled with the covering material including a shape-retaining polymer and filler to cure the covering material, thus obtaining a battery pack covered with the covering material.

Further, in the method for producing a battery pack of an embodiment, using a protrusion formed on or attached to the molding die, a rippable portion which is composed of a thin-wall portion as a filling mark and which is capable of ripping open due to gas generated from the battery in the event of an abnormal condition is formed in the covering material filling the space around the battery and the protection circuit board within the molding die and being cured.

Alternatively, in the method for producing a battery pack according to an embodiment, instead of the rippable portion composed of a thin-wall portion as a filling mark formed in the covering material, a rippable portion composed of a brittle member capable of deforming due to gas generated from the battery in the event of an abnormal condition is formed as follows. The brittle member is disposed in a predetermined position within the cavity, together with the battery and the protection circuit board, and then the cavity is filled with the covering material including a shape-retaining polymer and filler to cure the covering material, thus forming a rippable portion composed of the brittle member.

With respect to the molding die used in the above embodiment, there is no particular limitation as long as the battery 20 covered with the aluminum laminate film 17, the protection circuit board, the spacer, a cushioning material (mentioned below) optionally used, and the protrusion forming a thin-wall portion or the brittle member can be disposed in the cavity of the molding die, but the molding die generally has two or more gates for guiding a molten molding material into the cavity. Therefore, in the resultant battery pack, the cured excess molding material according to the gates remains on any portion of the covering material, and, in the present embodiment, the excess molding material is trimmed away, but a slight resin filling mark is left.

The protection circuit board is generally disposed above the positive electrode terminal 15a and negative electrode terminal 15b (see FIG. 16). When the battery 20 is in a rectangular plate shape (the battery covering material to be formed is in a rectangular plate shape), the cushioning material is disposed on the side from which the terminals 15a and 15b are electrically extended or the opposite side, or both. Specifically, in FIG. 16, the cushioning material is disposed on one short side or both short sides of the battery 20 in a rectangular plate shape. The protection circuit board and the cushioning material which are thus disposed are combined into one-unit with the battery 20 by using the covering material.

The cushioning material not only protects the battery and protection circuit board but also improves the resultant battery pack in impact resistance. Therefore, as a material for the cushioning material, there is preferably used a resin having an impact resistance and excellent dimensional accuracy, such as polycarbonate, an acrylonitrile-butadiene-styrene (ABS)

resin, polypropylene, or polyethylene, a metal, such as aluminum or stainless steel, or a resin material having insert-molded thereinto a metal material, such as aluminum.

In an embodiment, differing from the known battery pack, all the dimensional variations can be absorbed by the shape-retaining polymer, and therefore various types of rubber plastics can be further used. Specifically, a natural rubber, a vulcanized synthetic rubber, such as polybutadiene, butadiene-acrylonitrile, styrene-butadiene, or chloroprene, ebonite, an urethane rubber, or a silicone rubber can be used.

Figure 13:
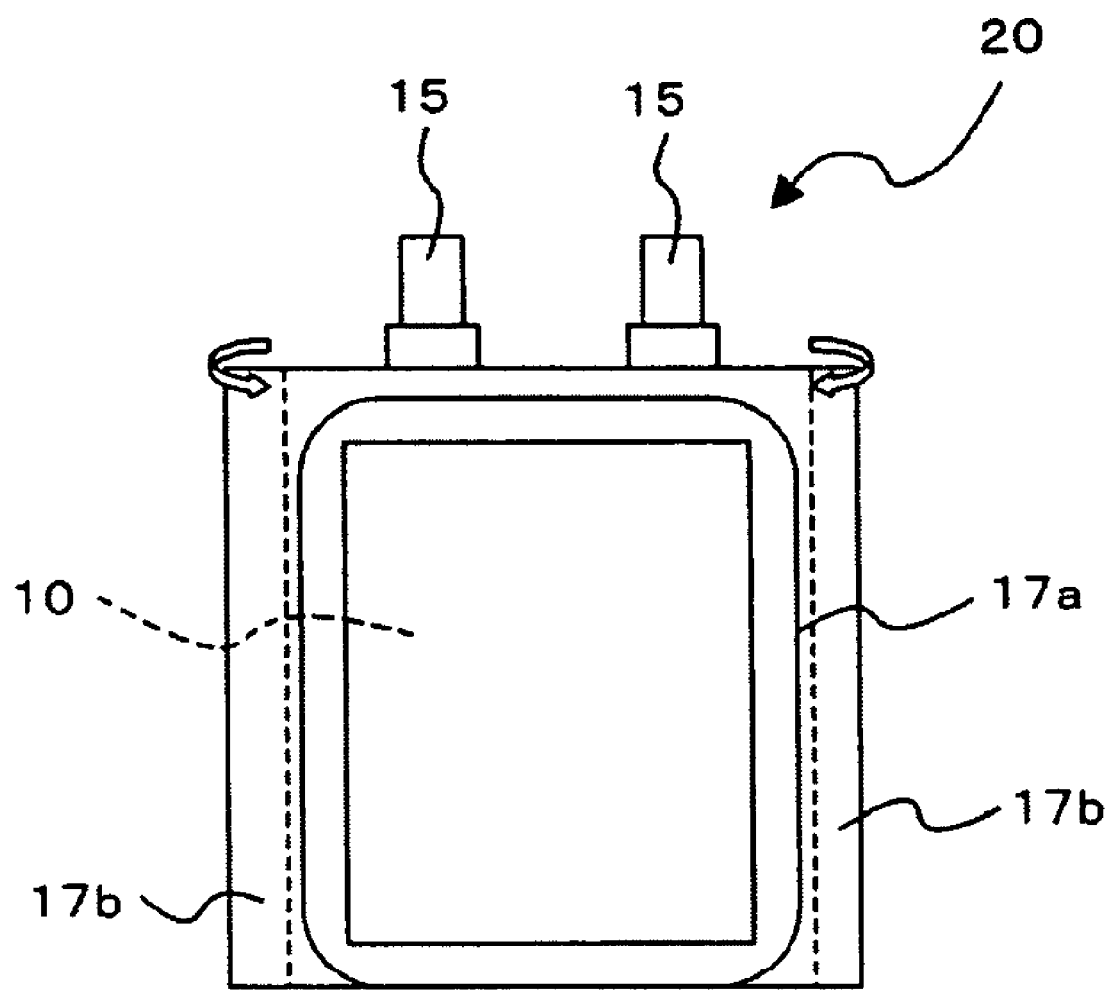
FIG. 13 is an explanatory top view of a battery showing a state of the battery in the battery pack of FIG. 12 before bending the side sealing portions.

Next, a way of producing a battery pack according to the present embodiment is described. As shown in FIG. 13, for improving the stiffness and resin bite, the side sealing portions 17b formed along the sides of the battery 20 are first bent along broken lines shown in the figure to achieve a state shown in FIG. 14A.

Figure 14A:
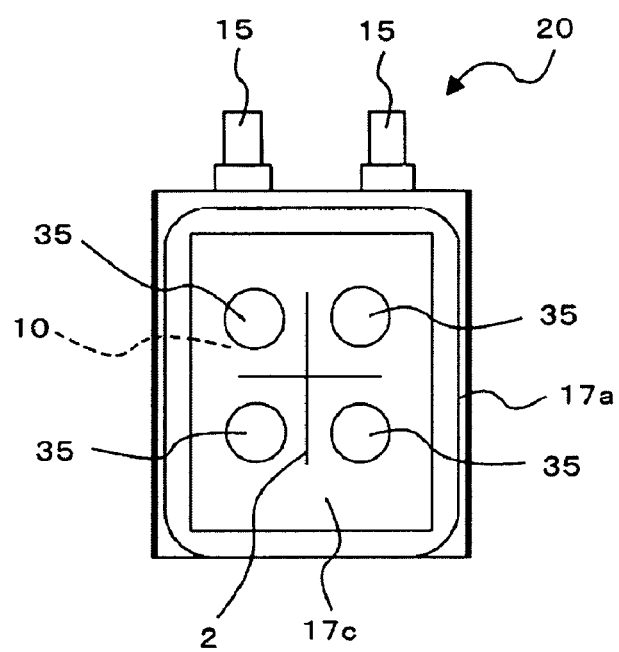
FIG. 14A is an explanatory top view.
Figure 14B:
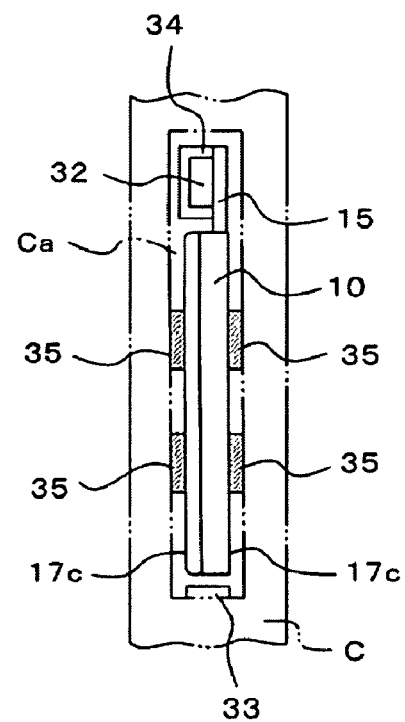
FIG. 14B is an explanatory, longitudinal sectional view.
Figure 14C:
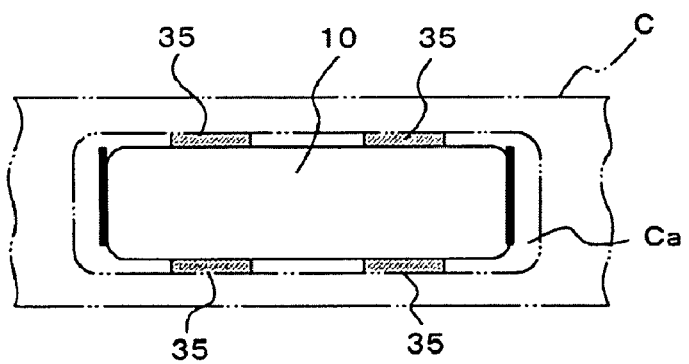
FIG. 14C is an explanatory transverse sectional view of a battery, each showing a way of covering the battery in FIG. 13 with the covering material to produce a battery pack.
Figure 15:
FIG. 15 is an explanatory perspective view of a spacer to be unified with the covering material of the battery pack in FIG. 12.

Then, a protection circuit board 32 and a cushioning material 34 are disposed on the top side of the battery 20, and a cushioning material 33 is disposed on the bottom side, and spacers 35 in a cylinder shape are disposed on a pair of surfaces 17c which are the largest surface among the six plane surfaces of the battery 20, and, in this state, as indicated by virtual lines shown in FIGS. 14B and 14C, they are placed in a cavity Ca of a molding die C, and then a covering material 18 including the shape-retaining polymer and the filler are filled into the cavity Ca of the molding die C.

A not shown protrusion for forming a filling mark constituting the thin-wall portion in the covering material is formed in the molding die C.

In this case, the spacers 35 are in contact with the molding die C, and therefore the battery 20 and protection circuit board 32 are held in a predetermined position in the cavity Ca with high accuracy. In addition, the spacers 35 are disposed so that they cover the largest surface 17c of the battery 20 and maintain the filling space for the covering material 18, and thus the covering material 18 flows to the whole of the cavity Ca.

Figure 12A:
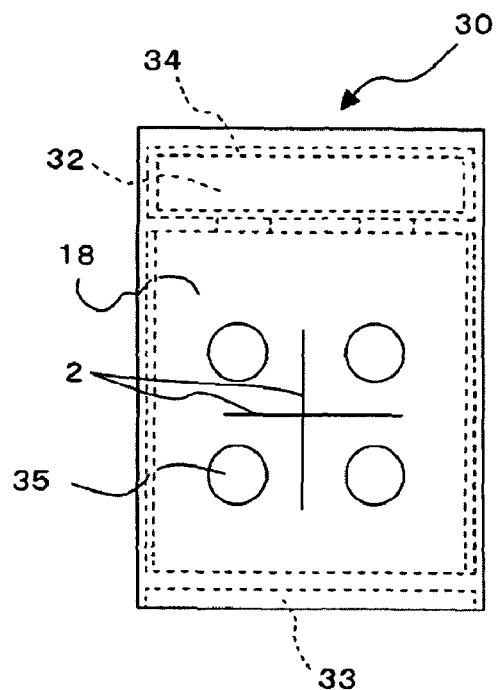
FIG. 12A is an explanatory top view.
Figure 12B:
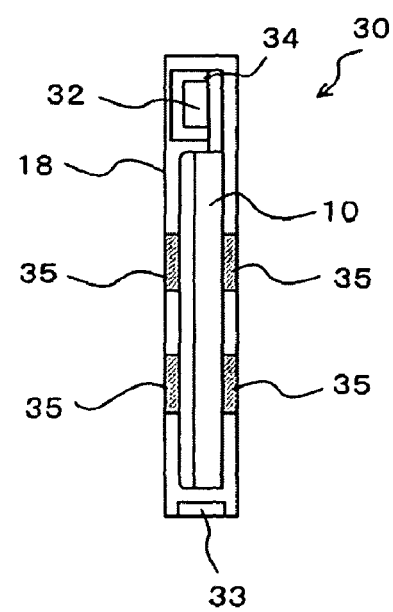
FIG. 12B is an explanatory, longitudinal sectional view.
Figure 12C:
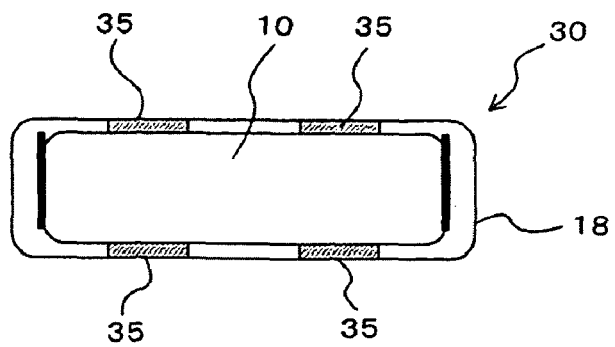
FIG. 12C is an explanatory, transverse sectional view, each showing a battery pack according to an embodiment.

The covering material 18 including the shape-retaining polymer and the filler is then cured in the cavity Ca to obtain a battery pack 30 according to the present embodiment in which, as shown in FIG. 12, the aluminum laminate film 17 is covered with the covering material 18. In this case, the spacers 35 are combined into one-unit with the cured covering material 18 and remain in the battery pack 30. In the covering material 18, as shown in FIG. 12 or FIG. 14, a thin-wall portion 2 as a filling mark constituting the rippable portion is formed.

Instead of the rippable portion composed of the thin-wall portion 2, a not shown brittle member constituting the rippable portion can be disposed in the cavity Ca, together with the battery 20 and protection circuit board 32, and covered with the covering material 18, together with the battery and the protection circuit board 32, to obtain a battery pack.

According to an embodiment, as described above, there can be obtained a battery pack which is advantageous not only in that the battery pack has both high dimensional accuracy and high mechanical strength, but also in that it can be reduced in size and weight. The battery pack 30 generally has a connection terminal for connecting the battery to an external electric device, but the descriptions of this are omitted in the above embodiment.

In the above embodiment, the non-aqueous electrolyte secondary battery 20 using a gel electrolyte is described, but the present disclosure can be applied to a laminate film-covered battery pack using an electrolytic solution. In this case, the step for applying a gel electrolyte to the surfaces of the positive electrode and negative electrode in the above embodiment is omitted, and a step for charging an electrolytic solution is inserted into the heat-sealing step for laminate film. More specifically, three sides of the battery element 10 in a rectangular plate shape are heat-sealed and then an electrolytic solution is filled through the remaining one open side, followed by heat sealing of the side. The resultant sealed portion has a whole shape of rectangular frame.

Figure 19:
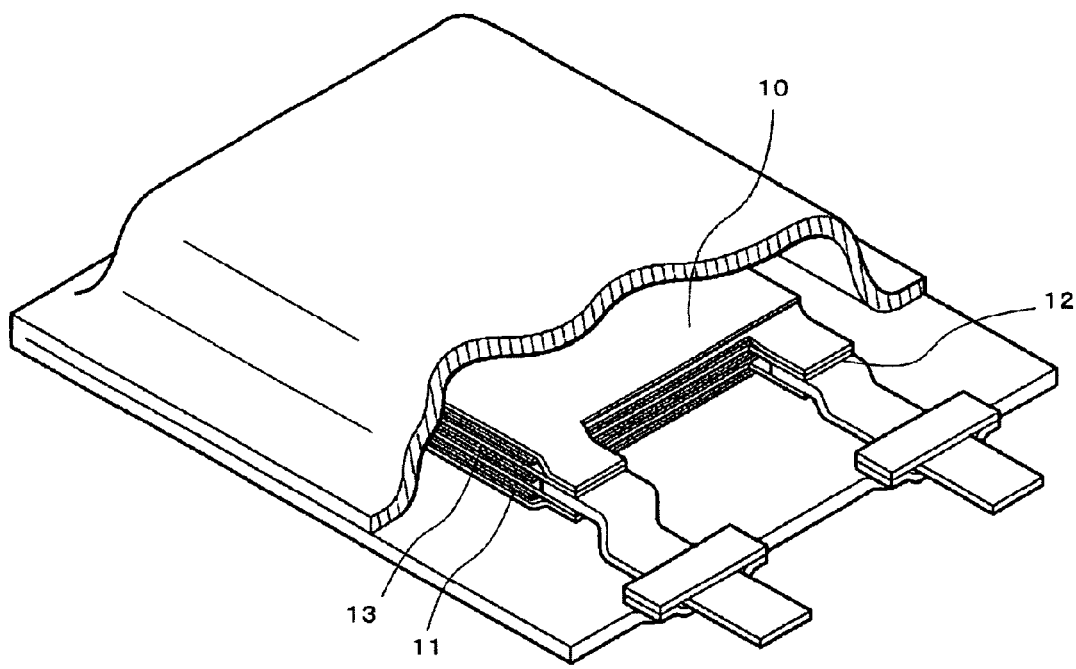
FIG. 19 is an explanatory perspective view of a stacked-type battery element, showing another example of the construction of a battery element used in the battery pack according to an embodiment.

In the above embodiment, an example is described in which the battery element 10 includes the positive electrode 11, negative electrode 12, and separators 13a, 13b which are spirally wound together wherein each separator is disposed between the positive and negative electrodes, but, needless to say, the present disclosure can be applied to a battery pack having, as shown in FIG. 19, a battery element 10 including a positive electrode 11, a negative electrode 12, and a separator 13 which are stacked on one another wherein the separator is disposed between the positive and negative electrodes.

EXAMPLES

Hereinbelow, the embodiments will be described in more detail with reference to the following Examples and Comparative Examples, which should not be construed as limiting.

Examples 1 to 16

An example of a battery pack having a rippable portion composed of a brittle member embedded in the covering material is shown.

A battery covered with a film shown in Table 1 was first prepared, and connected to a protection circuit board being capable of controlling a voltage and a current of the battery, and, in this state, the battery was inserted into a surrounding space within a molding die and fixed to a predetermined position within the cavity, together with a cushioning material, a spacer, and a brittle member having a shape shown in Table 1. Then, a resin including a filler material shown in Table 1 was filled through three resin inlet holes each having a hole size of 0.5 mm formed in the upper portion of the molding die to fill the cavity, and, at a point in time when an excess resin started to be ejected from three resin eject holes formed in the lower portion of the molding die, the molding die was allowed to stand in a thermostatic chamber at a temperature shown in Table 1 for a period of time shown in Table 1, or, using a transparent molding die, the resin was irradiated with ultraviolet light having a wavelength of 365 nm for a period of time shown in Table 1 to cure the resin, forming a covering material. The excess resin remaining at the discharge holes was cut, thus obtaining a battery pack in each Example.

With respect to each of the battery packs in the Examples, a glass transition temperature (Tg) of the resin used in the covering material, a durometer D hardness of the covering material, measured in accordance with JIS K7215, a flexural strength and a flexural modulus of the covering material, measured in accordance with JIS K7171, and others are shown in Table 1.

Further, with respect to each of the battery packs in the Examples, an embedding place, size, and shape of the brittle member are shown in Table 1.

In Table 1, "Largest width" indicates the largest size of the brittle member, "Size of embedding side" indicates the largest length in the largest surfaces of the covering material, and "Ratio to embedding side" indicates a ratio of the largest width to the size of the embedding side {Largest width (mm)/Size of embedding side (mm)×100 (%)}. "Largest thickness"

indicates the largest thickness of the brittle member, and "Ratio of thickness to embedding side" indicates a ratio of the largest thickness of the brittle member to the thickness of the covering material (Largest thickness/Thickness of covering material×100 (%)).

Comparative Examples 1 to 5

A battery in Comparative Example 1 having an aluminum laminate film was prepared.

A battery pack in Comparative Example 2 was prepared in the same manner as in Examples 1 to 16, except that no brittle member was used, and that the cavity was filled with a resin containing no filler material and then allowed to stand at room temperature for one day to cure the resin.

Battery packs in Comparative Examples 3 and 4 were individually prepared in the same manner as in Examples 1 to 16, except that no brittle member was used, and that a resin containing no filler material was melted and subjected to extrusion at a temperature shown in Table 1 and cured for a period of time shown in Table 1.

A battery pack in Comparative Example 5 was prepared in the same manner as in Examples 1 to 16, except that no brittle member was used, and that the cavity was filled with a resin containing no filler material and allowed to stand at 100° C. for 1.5 hour to cure the resin.

Evaluation of Battery Performance (1) Evaluation of Energy Density (Wh/l)

At a temperature of 23° C., a cycle of 1 C constant-current and constant-voltage charging at an upper limit of 4.2 V for 15 hours and 1 C constant current discharging to a final voltage of 2.5 V was repeatedly conducted, and a rated energy density was determined from a discharge capacity in the first cycle. The results are shown in Table 2.

Rated energy density $(Wh/l) = \{(\text{Average discharge voltage }(V) \times \text{Rated capacity }(Ah)\}/\text{Battery volume}$ (1)

Note that 1 C indicates a current with which the theoretical capacity of a battery can be discharged in one hour.

(2) Drop Test (A)

For observing variations of mechanical strength with respect to the battery packs in the Examples, ten battery packs were prepared per one Example, and all the ten battery packs were individually allowed to freely fall from a height of 2 meters to a concrete floor. The test was conducted 10 times per one battery pack so that all the six plane surfaces of the battery pack individually hit the floor. The number of battery pack(s) which had no damage was designated by OK, and the number of battery pack(s) which had a fracture or suffered removal of components was designated by NG. The results are shown in Table 2.

(3) Drop Test (B)

With respect to each of the Examples, the battery pack was allowed to freely fall from a height of 1.2 meters to a concrete floor 50 times, and then a size change($\Delta t$) was measured. The results are shown in Table 2.

(4) Overcharge Test

A battery pack having a rated capacity of 850 mAh in a discharged state was placed in a thermostatic chamber at 50° C., and a voltage of 18 V and a charging current of 1,700 mA (2 C) were applied to a terminal between the positive electrode and the negative electrode for 3 hours to make overcharge, and a temperature change was observed to evaluate overcharge characteristics.

TABLE 1

| | Filler | Resin | Curing method | Curing time | Tg[1] (° C.) | D[2] hard-ness | Flexural strength (MPa) | Flexural modulus (MPa) | Embedding place | Shape |
|---|---|---|---|---|---|---|---|---|---|---|
| Ex. 1 | SiO$_2$ | Epoxy | 90° C. | 30 Min | 45 | D80 | 75 | 3,100 | One place in each of top and back largest surfaces | Cuboid |
| Ex. 2 | SiO$_2$ | Epoxy | 85° C. | 1 Hr | 110 | D60 | 9 | 290 | Two places in each of top and back largest surfaces | Cylinder |
| Ex. 3 | SiO$_2$ | Epoxy | Stand at r.t | 1 Day | 40 | D50 | 10 | 300 | One place in each of top and back largest surfaces | Cubiod |
| Ex. 4 | Al$_2$O$_3$ | Urethane | 60° C. | 1 Hr | 100 | D90 | 120 | 3,000 | One place in each of left and right of side portion | Cube |
| Ex. 5 | AlN | Urethane acrylate | 90° C. | 30 Min | 45 | D50 | 10 | 500 | Two places in top portion | Cylinder |
| Ex. 6 | Al$_2$O$_3$ | Acryl | UV | 5 Sec | 50 | D50 | 25 | 700 | One place in top portion | Prism |
| Ex. 7 | SiO$_2$ + AlN | Urethane acrylate | UV | 5 Sec | 50 | D50 | 40 | 1,000 | Top portion | Cone |
| Ex. 8 | None | Urethane | 85° C. | 20 Min | 45 | D30 | 20 | 400 | Top portion | Pyramid |
| Ex. 9 | None | Urethane | 85° C. | 20 Min | 60 | D50 | 70 | 1,500 | Top portion | Pyramid |
| Ex. 10 | None | Urethane | 85° C. | 20 Min | 85 | D60 | 25 | 750 | Top portion | Pyramid |
| Ex. 11 | None | Urethane | 85° C. | 20 Min | 95 | D80 | 95 | 2,200 | Top portion | Pyramid |
| Ex. 12 | None | Urethane | 85° C. | 20 Min | 95 | D80 | 95 | 2,200 | Top portion | Cylinder/ Inside: F.E. Agent[3] |
| Ex. 13 | None | Urethane | 85° C. | 20 Min | 95 | D80 | 95 | 2,200 | Top portion | Cylinder/ Inside: |

TABLE 1-continued

|  |  |  |  |  |  |  |  |  |  | H. A. Agent[4] |
|---|---|---|---|---|---|---|---|---|---|---|
| Ex. 14 | Zeolite | Epoxy | 60° C. | 1 Hr | 60 | D70 | 55 | 800 | Top | Cylinder |
| Ex. 15 | Zeolite | Epoxy | UV | 5 Sec | 70 | D80 | 45 | 600 | Top | Cylinder |
| Ex. 16 | SiO$_2$ | Acryl | 100° C. | 5 Min | 80 | D75 | 70 | 1,200 | Top | Cylinder |
| Comp. Ex. 1 | — | — | — | — | — | — | — | — | — | — |
| Comp. Ex. 2 | — | Epoxy | Stand at r.t. | 1 Day | 45 | D90 | 60 | 6,600 | — | — |
| Comp. Ex. 3 | — | ABS | 120° C. Melt extrusion | 5 Sec | 120 | D85 | 85 | 1,700 | — | — |
| Comp. Ex. 4 | — | Urethane | 110° C. Melt extrusion | 5 Sec | 110 | D90 | 20 | 700 | — | — |
| Comp. Ex. 5 | — | Urethane | 100° C. Thermo-setting resin | 1.5 Hr | 70 | A50 | 15 | 750 | — | — |

|  | Resin for brittle member | D[2] hardness of brittle member | Largest width (mm) | Size of embedding side (mm) | Ratio to embedding side (%) | Largest thickness (μm) | Ratio of thickness to embedding side (%) | Packaging member |
|---|---|---|---|---|---|---|---|---|
| Ex. 1 | Natural rubber | D3 | 0.8 | 34 | 2.4 | 200 | 80 | Aluminum laminate film |
| Ex. 2 | Poly-butadiene | D60 | 2 | 34 | 5.9 | 210 | 84 | Aluminum laminate film |
| Ex. 3 | Butadiene-actylo-nitrile rubber | D5 | 1 | 34 | 2.9 | 200 | 80 | Aluminum laminate film |
| Ex. 4 | Styrene-butadiene rubber | D40 | 2 | 54 | 3.7 | 150 | 60 | Aluminum laminate film |
| Ex. 5 | Chloro-prene rubber | D10 | 25 | 34 | 7.4 | 50 | 20 | Aluminum laminate film |
| Ex. 6 | Ebonite | D30 | 3 | 34 | 8.8 | 100 | 40 | Aluminum laminate film |
| Ex. 7 | Urethane rubber | D20 | 4 | 34 | 11.8 | 150 | 75 | Aluminum laminate film |
| Ex. 8 | Silicone rubber | D20 | 5 | 34 | 14.7 | 100 | 66.7 | Aluminum laminate film |
| Ex. 9 | Poly-ethylene | D20 | 5 | 34 | 14.7 | 100 | 66.7 | Aluminum laminate film |
| Ex. 10 | Poly-propylene | D20 | 5 | 34 | 14.7 | 100 | 66.7 | Aluminum laminate film |
| Ex. 11 | Polyamide | D20 | 5 | 34 | 14.7 | 100 | 66.7 | Aluminum laminate film |
| Ex. 12 | Polyamide | D25 | 5 | 34 | 14.7 | 100 | 66.7 | Aluminum laminate film |
| Ex. 13 | Acryl | D25 | 5 | 34 | 14.7 | 100 | 66.7 | Aluminum laminate film |
| Ex. 14 | Acryl | D25 | 10 | 34 | 29.4 | 100 | 66.7 | PE[5] Film + PET film two layers |
| Ex. 15 | Urethane | D25 | 20 | 34 | 58.8 | 100 | 80.0 | PP[6] Film + PET film two layers |
| Ex. 16 | Urethane | D25 | 30 | 34 | 88.2 | 100 | 90.9 | PE[5] Film single layer |
| Comp. Ex. 1 | — | — | — | — | — | — | — | Aluminum laminate film |
| Comp. Ex. 2 | — | — | — | — | — | — | — | Aluminum laminate film |
| Comp. Ex. 3 | — | — | — | — | — | — | — | Aluminum laminate film |
| Comp. Ex. 4 | — | — | — | — | — | — | — | Aluminum laminate film |
| Comp. Ex. 5 | — | — | — | — | — | — | — | Aluminum laminate film |

Note:
[1] Glass transition temperature
[2] Durometer
[3] Fire-extinguishing agent
[4] Heat-absorbing agent
[5] Polyethylene
[6] Polypropylene

TABLE 2

|  | thickness after coating (μm) | Size | Rated E density (Wh/l) | Drop test from 2 mm height, 10 times | (Reference) Size change Δt after drop test from 1.2 mm height, 50 times | Highest temperature in 2 C 18 V overcharge test at 50° C. |
|---|---|---|---|---|---|---|
| Ex. 1 | 250 | 413454 | 485 | 10 Battery packs all OK | Fracture/1.2 | 155 |
| Ex. 2 | 250 | 413454 | 485 | 10 Battery packs all OK | Fracture/1.2 | 152 |
| Ex. 3 | 250 | 413454 | 485 | 10 Battery packs all OK | Fracture/1.2 | 118 |
| Ex. 4 | 250 | 413454 | 485 | 10 Battery packs all OK | 1.1 | 107 |
| Ex. 5 | 250 | 413454 | 485 | 10 Battery packs all OK | 1 | 93 |
| Ex. 6 | 250 | 413454 | 485 | 10 Battery packs all OK | 0.9 | 105 |
| Ex. 7 | 200 | 413454 | 495 | 10 Battery packs all OK | 0.8 | 110 |
| Ex. 8 | 150 | 413454 | 505 | 10 Battery packs all OK | 0.5 | 65 |
| Ex. 9 | 150 | 413454 | 505 | 10 Battery packs all OK | 0.3 | 73 |
| Ex. 10 | 150 | 413454 | 505 | 10 Battery packs all OK | 0.4 | 86 |
| Ex. 11 | 150 | 413454 | 505 | 10 Battery packs all OK | 0.2 | 92 |
| Ex. 12 | 150 | 413454 | 505 | 10 Battery packs all OK | 0.2 | 71 |
| Ex. 13 | 150 | 413454 | 505 | 10 Battery packs all OK | 0.2 | 70 |
| Ex. 14 | 150 | 413454 | 520 | 10 Battery packs all OK | 0.2 | 62 |
| Ex. 15 | 125 | 413454 | 530 | 10 Battery packs all OK | 0.1 | 61 |
| Ex. 16 | 110 | 413454 | 545 | 10 Battery packs all OK | 0.1 | 72 |
| Comp. Ex. 1 | — | 383450 | 450 | 10 Battery packs NG | 2.8 | >400 |
| Comp. Ex. 2 | 250 | 413454 | 460 | 8 Battery packs NG | Fracture/2.4 | >400 |
| Comp. Ex. 3 | 300 | 413454 | No battery capacity | 10 Battery packs all OK | 2.1 | — |
| Comp. Ex. 4 | 300 | 413454 | No battery capacity | 10 Battery packs all OK | 2.2 | — |
| Comp. Ex. 5 | 250 | 413454 | 460 | 10 Battery packs NG | 2.3 | >400 |

As can be seen from Table 2, with respect to the thickness of the covering material (thickness after coating/μm), in each of the battery packs in Examples 1 to 16, the thickness of the covering material is 250 μm or less, and the battery pack can be reduced in thickness (or reduced in size and weight). By contrast, in each of the battery packs in Comparative Examples 2 to 5, the thickness of the covering material (thickness after coating/em) is 250 μm or more, and the battery pack is less reduced in thickness (or reduced in size and weight) than the battery pack of the embodiment.

As can be seen from Table 2, with respect to the rated energy density (Wh/l), the battery packs in Examples 1 to 16 have a battery capacity as high as 485 (Wh/l) or more. By contrast, the battery and battery packs in Comparative Examples 1 to 5 have a battery capacity lower than the battery capacity in Examples 1 to 16, and especially the battery packs in Comparative Examples 3 and 4 had no battery capacity.

As can be seen from Table 2, with respect to the drop test from a height of 2 meters, each of the battery packs in Examples 1 to 16 has such high mechanical strength that all the ten battery packs have no damage, such as a fracture or removal of components. By contrast, each of the battery in Comparative Example 1 and the battery packs in Comparative Examples 2 and 5 has such low mechanical strength that the number of batteries or battery packs which suffer a fracture or removal of components is large.

Further, as can be seen from Table 2, with respect to the drop test from a height of 1.2 meters, the battery packs in Examples 1 to 16 have such high mechanical strength that the size change is as small as 1.1 or less, whereas the battery and battery packs in Comparative Examples 1 to 5 have such low mechanical strength that the size change is as large as 2.0 or more.

From the results of the overcharge test shown in Table 2, with respect to the battery packs in Examples 1 to 16, it has been found that the highest temperature is as relatively low as 155° C. or less and heat runaway, such as gas emission or ignition, does not occur even in an unusual environment. Further, it is apparent that the ripping open vent is capable of quickly ripping open to suppress an internal pressure rise of the battery on the initial stage, so that the highest temperature is lowered and can be reduced to 61° C. at the lowest.

By contrast, with respect to the battery and battery packs in Comparative Examples 1 to 5, it has been found that the highest temperature possibly exceeds 400° C. and heat runaway, such as gas emission or ignition, occurs in an unusual environment.

A size of the battery pack in a rectangular shape is designated by, e.g., 383450 or 413454. These designations are common expression meaning thickness in a unit of 0.1 mm, lateral size in a unit of 1 mm, and lengthwise size in a unit of 1 mm in the order from the left to the right. For example, 383450 means that the thickness is 3.8 mm, the lateral size is 34 mm, and the lengthwise size is 50 mm.

Examples 17 to 21

An example of a battery pack having a rippable portion composed of a recessed thin-wall portion as a protrusion mark formed in the covering material is shown.

A battery covered with an aluminum laminate film was first prepared, and connected to a protection circuit board being capable of controlling a voltage and a current of the battery, and, in this state, the battery was inserted into a surrounding space within a molding die and fixed to a predetermined position within the cavity, together with a cushioning material and a spacer. Then, a resin shown in Table 3 was filled through three resin inlet holes each having a hole size of 0.5 mm formed in the upper portion of the molding die to fill the cavity, and, at a point in time when an excess resin started to be ejected from three resin discharge holes formed in the lower portion of the molding die, the molding die was allowed to stand in a thermostatic chamber at a temperature shown in Table 3 for a period of time shown in Table 3, or, using a transparent molding die, the resin was irradiated with ultraviolet light having a wavelength of 365 nm for a period of time shown in Table 3 to cure the resin, forming a covering material. In the resultant covering material, a thin-wall portion having a shape shown in FIGS. 1 to 5 seen in Table 3 was formed, wherein the thin-wall portion corresponds to a protrusion mark (filling mark) formed due to a protrusion formed at or attached to a predetermined position in the molding die. The excess resin remaining at the discharge holes was cut, thus obtaining a battery pack in each Example.

Examples 22 to 25

An example of a battery pack having a rippable portion composed of a brittle member embedded in the covering material is shown.

Battery packs in Examples 22 to 25 were individually prepared in the same manner as in Examples 1 to 16, except that conditions shown in Table 3 were employed, and that a brittle member having a shape shown in Table 3 was formed.

Comparative Examples 6 to 10

Battery packs in Comparative Examples 6 to 10 were individually prepared in the same manner as in Examples 17 to 25, except that conditions shown in Table 3 were employed, and that no thin-wall portion or no brittle member was formed.

With respect to each of the battery packs in the above Examples and Comparative Examples, performance was evaluated by the above method. The results are shown in Table 4.

TABLE 3

| | Filler | Resin | Curing method | Curing time | Glass transition temperature/Tg (° C.) | Durometer hardness | Flexural strength (MPa) | Flexural modulus (MPa) | Embedding place | Shape | Shape | Depth (μm) | Packaging member |
|---|---|---|---|---|---|---|---|---|---|---|---|---|---|
| Ex. 17 | TiO$_2$ | Epoxy | 90° C. | 30 Min | 45 | D80 | 75 | 3,100 | One place in each of top and back largest surfaces | — | FIG. 1 | 10 | Aluminum laminate film |
| Ex. 18 | SiO$_2$ | Urethane | 85° C. | 1 Hr | 110 | D60 | 9 | 290 | One place in each of left and right of side portion | — | FIG. 2 | 20 | Aluminum laminate film |
| Ex. 19 | SiO$_2$ | Urethane acrylate | UV | 5 Sec | 40 | D50 | 10 | 300 | Two places in top portion | — | FIG. 3 | 30 | Aluminum laminate film |
| Ex. 20 | SiO$_2$ | Acryl | 60° C. | 1 Hr | 100 | D90 | 120 | 3,000 | One place in top portion | — | FIG. 4 | 50 | Aluminum laminate film |
| Ex. 21 | Al$_2$O$_3$ | Epoxy | UV | 15 Sec | 45 | D50 | 10 | 500 | One place in top portion | | FIG. 5 | 80 | Aluminum laminate film |
| Ex. 22 | None | Urethane | 85° C. | 20 Min | 45 | D30 | 20 | 400 | One place in top portion | Pyramid | 5 | 34 | Aluminum laminate film |
| Ex. 23 | None | Urethane | 80° C. | 10 Min | 60 | D50 | 70 | 1,500 | One place in top portion | Pyramid | 5 | 34 | Aluminum laminate film |
| Ex. 24 | None | Urethane | 60° C. | 5 Min | 85 | D60 | 25 | 750 | One place in top portion | Pyramid | 5 | 34 | Aluminum laminate film |
| Ex. 25 | None | Urethane | 50° C. | 3 Min | 95 | D80 | 95 | 2,200 | One place in top portion | Pyramid | 5 | 34 | Aluminum laminate film |
| Comp. Ex. 6 | — | Acryl | Stand at r.t. | 1 Day | — | — | — | — | — | — | — | — | Aluminum laminate film |
| Comp. Ex. 7 | — | Epoxy | Stand at r.t. | 1 Day | — | — | — | — | — | — | — | — | Aluminum laminate film |
| Comp. Ex. 8 | — | ABS | 120° C. Melt extrusion | 5 Sec | 120 | D85 | 85 | 1,700 | — | — | — | — | Aluminum laminate film |
| Comp. Ex. 9 | — | Urethane | 110° C. Melt extrusion | 5 Sec | 110 | D90 | 20 | 700 | — | — | — | — | Aluminum laminate film |
| Comp. Ex. 10 | — | Urethane | 40° C. Thermosetting resin | 1.5 Hr | 70 | A50 | 15 | 750 | — | — | — | — | Aluminum laminate film |

TABLE 4

|  | thickness after coating (μm) | Size | Rated E density (Wh/l) | Drop test from 2 mm height, 10 times | (Reference) Size change Δt after drop test from 1.2 mm height, 50 times | Highest temperature in 2 C 20 V overcharge test at 50° C. |
|---|---|---|---|---|---|---|
| Ex. 17 | 250 | 413454 | 485 | 10 Battery packs all OK | Fracture/1.2 | 151 |
| Ex. 18 | 200 | 413454 | 495 | 10 Battery packs all OK | 1.5 | 120 |
| Ex. 19 | 150 | 413454 | 505 | 10 Battery packs all OK | 1.5 | 92 |
| Ex. 20 | 125 | 413454 | 520 | 10 Battery packs all OK | 1.1 | 88 |
| Ex. 21 | 100 | 413454 | 530 | 10 Battery packs all OK | 1 | 91 |
| Ex. 22 | 150 | 413454 | 505 | 10 Battery packs all OK | 0.5 | 65 |
| Ex. 23 | 150 | 413454 | 505 | 10 Battery packs all OK | 0.3 | 73 |
| Ex. 24 | 150 | 413454 | 505 | 10 Battery packs all OK | 0.4 | 86 |
| Ex. 25 | 150 | 413454 | 505 | 10 Battery packs all OK | 0.2 | 92 |
| Comp. Ex. 6 | — | 413454 | 450 | 10 Battery packs NG | Fracture/2.4 | >400 |
| Comp. Ex. 7 | 250 | 413454 | 460 | 10 Battery packs all OK | Fracture/2.4 | >400 |
| Comp. Ex. 8 | 300 | 413454 | No battery capacity | 10 Battery packs all OK | 2.1 | — |
| Comp. Ex. 9 | 300 | 413454 | No battery capacity | 10 Battery packs all OK | 2.2 | — |
| Comp. Ex. 10 | 250 | 413454 | 460 | 10 Battery packs NG | 2.3 | >400 |

As can be seen from Table 4, with respect to the thickness of the covering material (thickness after coating/μm), in each of the battery packs in Examples 17 to 25, the thickness of the covering material is 250 μm or less, it can be confirmed that the battery pack is reduced in thickness (or reduced in size and weight). By contrast, in each of the battery packs in Comparative Examples 6 to 10, the thickness of the covering material (thickness after coating/μm) is 250 μm or more, and the battery pack is less reduced in thickness (or reduced in size and weight) than the battery pack of an embodiment.

As can be seen from Table 4, with respect to the rated energy density (Wh/l), the battery packs in Examples 17 to 25 have a battery capacity as high as 485 (Wb/l) or more. By contrast, the battery and battery packs in Comparative Examples 6 to 10 have a battery capacity lower than the battery capacity in Examples 17 to 25, and especially the battery packs in Comparative Examples 8 and 9 had no battery capacity.

As can be seen from Table 4, with respect to the drop test from a height of 2 meters, each of the battery packs in Examples 17 to 25 has such high mechanical strength that all the ten battery packs have no damage, such as a fracture or removal of components. By contrast, each of the battery packs in Comparative Examples 6 and 10 has such low mechanical strength that all the ten battery packs suffer a fracture or removal of components.

Further, as can be seen from Table 4, with respect to the drop test from a height of 1.2 m, the battery packs in Examples 17 to 25 have such high mechanical strength that the size change is as small as 1.5 or less, whereas the battery packs in Comparative Examples 6 to 10 have such low mechanical strength that the size change is as large as 2.1 or more.

From the results of the overcharge test shown in Table 4, with respect to the battery packs in Examples 17 to 25, it has been found that the highest temperature is as relatively low as 151° C. or less and heat runaway, such as gas emission or ignition, does not occur even in an unusual environment. Further, it is apparent that the ripping open vent is capable of quickly ripping open to suppress an internal pressure rise of the battery on the initial stage, so that the highest temperature is lowered and can be reduced to 61° C. at the lowest.

By contrast, with respect to the batteries or battery packs in Comparative Examples 6 to 10, it has been found that the highest temperature possibly exceeds 400° C. and heat runaway, such as gas emission or ignition, occurs in an unusual environment.

A size of the battery pack in a rectangular shape is designated by, e.g., 383450 or 413454. These designations are common expression meaning thickness in a unit of 0.1 mm, lateral size in a unit of 1 mm, and lengthwise size in a unit of 1 mm in the order from the left to the right. For example, 383450 means that the thickness is 3.8 mm, the lateral size is 34 mm, and the lengthwise size is 50 mm.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
    a battery which includes a battery element covered with a packaging member, the battery element including a positive electrode and a negative electrode which are spirally wound or stacked through a separator;
    a battery protection circuit board;
    a covering material collectively covering the battery and the battery protection circuit board; and
    a rippable portion formed in a part of the covering material, the rippable portion being capable of ripping open due to gas generated from the battery in the event of an abnormal condition to form a gas release hole for releasing the gas outside the battery pack; and
    wherein the covering material is a composite material including a shape-retaining polymer and a filler material.

2. The battery pack according to claim 1, wherein the rippable portion is a thin-wall portion composed of a filling mark when the covering material is filled in a surrounding space within a molding die containing the battery and the protection circuit board, and is cured.

3. The battery pack according to claim 1, wherein the rippable portion is composed of a brittle member embedded in the covering material, together with the battery and the protection circuit board, the brittle member having a mechanical strength smaller than that of the covering material.

4. The battery pack according to claim 1, wherein the shape-retaining polymer is at least one resin selected from the group consisting of an urethane resin, an acrylic resin, and an epoxy resin.

5. A battery pack comprising:
  a battery which includes a battery element covered with a packaging member, the battery element including a positive electrode and a negative electrode which are spirally wound or stacked through a separator;
  a battery protection circuit board;
  a covering material collectively covering the battery and the battery protection circuit board; and
  a rippable portion formed in a part of the covering material, the rippable portion being capable of ripping open due to gas generated from the battery in the event of an abnormal condition to form a gas release hole for releasing the gas outside the battery pack; and
  wherein the covering material has a durometer D hardness of the covering material measured at a temperature greater than or equal to 60° C. smaller than a durometer D hardness of the covering material measured at a standard temperature descried in JIS K7215.

6. A battery pack comprising:
  a battery which includes a battery element covered with a packaging member, the battery element including a positive electrode and a negative electrode which are spirally wound or stacked through a separator;
  a battery protection circuit board;
  a covering material collectively covering the battery and the battery protection circuit board; and
  a rippable portion formed in a part of the covering material, the rippable portion being capable of ripping open due to gas generated from the battery in the event of an abnormal condition to form a gas release hole for releasing the gas outside the battery pack;
  wherein the rippable portion is a thin-wall portion composed of a filling mark when the covering material is filled in a surrounding space within a molding die containing the battery and the protection circuit board, and is cured; and
  wherein the thin-wall portion is formed in at least one surface of a largest surface of the covering material and forms a rotational symmetrical body composed of two segment recess portions which cross each other.

7. The battery pack according to claim 2, wherein the thin-wall portion has a thickness corresponding to 20 to 80% of a total thickness of the covering material.

8. The battery pack according to claim 3, wherein the brittle member has a space portion therein.

9. The battery pack according to claim 3, wherein the brittle member has a length of one side of one surface of the brittle member, which length corresponds to 2.4% or more and 88.2% or less of the length of the longest side of the largest area of the covering material, or which length is 0.8 mm or more and 30 mm or less.

10. The battery pack according to claim 3, wherein the brittle member has a thickness corresponding to 20% or more and 90.9% or less of a thickness of the covering material, or a thickness of 50 μm or more and 210 μm or less.

11. The battery pack according to claim 3, wherein the brittle member is formed near a terminal of the battery.

12. A battery pack comprising:
  a battery which includes a battery element covered with a packaging member, the battery element including a positive electrode and a negative electrode which are spirally wound or stacked through a separator;
  a battery protection circuit board;
  a covering material collectively covering the battery and the battery protection circuit board; and
  a rippable portion formed in a part of the covering material, the rippable portion being capable of ripping open due to gas generated from the battery in the event of an abnormal condition to form a gas release hole for releasing the gas outside the battery pack;
  wherein the rippable portion is composed of a brittle member embedded in the covering material, together with the battery and the protection circuit board, the brittle member having a mechanical strength smaller than that of the covering material; and
  the brittle member has a hardness at 60° C. which is equal to or lower than the hardness at 60° C. of the covering material, and
  the brittle member has a durometer D hardness at 60° C. of D3 to D60, measured in accordance with JIS K7215, or a durometer A hardness at 60° C. of A20 to A90, measured in accordance with JIS K6253.

13. The battery pack according to claim 3, wherein the brittle member contains either one or both of a fire-extinguishing agent and a heat-absorbing agent.

* * * * *